United States Patent
Devos et al.

(10) Patent No.: US 10,104,960 B2
(45) Date of Patent: Oct. 23, 2018

(54) COMPOSED ELEMENT AND CORNER CONNECTION APPLIED HEREWITH

(71) Applicant: UNILIN, BVBA, Wielsbeke (BE)

(72) Inventors: Pieter Devos, Koolskamp (BE); Luc Maertens, Lichtervelde (BE); Luc Deman, Izegem (BE)

(73) Assignee: UNILIN, BVBA, Wielsbeke (BE)

( * ) Notice: Subject to any disclaimer, the term of this patent is extended or adjusted under 35 U.S.C. 154(b) by 1105 days.

(21) Appl. No.: 14/377,584

(22) PCT Filed: Feb. 7, 2013

(86) PCT No.: PCT/IB2013/051018
§ 371 (c)(1),
(2) Date: Aug. 8, 2014

(87) PCT Pub. No.: WO2013/118075
PCT Pub. Date: Aug. 15, 2013

(65) Prior Publication Data
US 2016/0000220 A1   Jan. 7, 2016

(30) Foreign Application Priority Data
Feb. 8, 2012   (BE) .................................. 2012/0079

(51) Int. Cl.
*A47B 47/04* (2006.01)
*F16B 12/12* (2006.01)
*F16B 12/46* (2006.01)

(52) U.S. Cl.
CPC .......... *A47B 47/042* (2013.01); *F16B 12/125* (2013.01); *F16B 12/46* (2013.01); *F16B 2012/463* (2013.01); *F16B 2012/466* (2013.01)

(58) Field of Classification Search
CPC ........ F16B 12/12; F16B 12/125; F16B 12/46; F16B 2012/463; F16B 2012/466; A47B 47/042
See application file for complete search history.

(56) References Cited

U.S. PATENT DOCUMENTS 1,533,099 A    4/1925  Carroll
4,099,887 A *  7/1978  Mackenroth ......... A63H 33/065
                                                        40/739
(Continued)

FOREIGN PATENT DOCUMENTS

CA    2826600 A1 * 10/2012 ........... A47B 47/042
EP    0479767 A1    4/1992
(Continued)

OTHER PUBLICATIONS

Belgium Search Report for corresponding Belgium Application No. 201200079, dated Feb. 8, 2012.
(Continued)

*Primary Examiner* — Jonathan P Masinick
(74) *Attorney, Agent, or Firm* — Workman Nydegger

(57) ABSTRACT

Composed element, with at least two wood-based panel-shaped elements; wherein said panel-shaped elements can be coupled to each other at an angle and with a miter joint by means of a locking tongue and groove connection; wherein the tongue consists of a split tongue, with thus at least a first tongue portion and a second tongue portion, as well as a slit situated there between; characterized in that said slit, seen in cross-section, globally extends according to a direction which deviates from the direction of the center line of the panel-shaped element on which the tongue is provided.

24 Claims, 11 Drawing Sheets

(56) References Cited

U.S. PATENT DOCUMENTS

| | | | |
|---|---|---|---|
| 7,818,939 B2* | 10/2010 | Bearinger | F16B 12/125 144/354 |
| 8,887,468 B2* | 11/2014 | Hakansson | A47B 47/0075 312/263 |
| 2006/0101769 A1* | 5/2006 | Pervan | E04F 15/02 52/591.1 |
| 2011/0280655 A1 | 11/2011 | Maertens et al. | |
| 2012/0027967 A1 | 2/2012 | Maertens et al. | |
| 2013/0071172 A1* | 3/2013 | Maertens | A47B 47/042 403/27 |
| 2013/0170904 A1 | 7/2013 | Cappelle et al. | |
| 2015/0320210 A1* | 11/2015 | Devos | A47B 88/0014 144/354 |

FOREIGN PATENT DOCUMENTS

| | | | |
|---|---|---|---|
| WO | 2010070605 A2 | 6/2010 | |
| WO | 2011151758 A2 | 12/2011 | |

OTHER PUBLICATIONS

International Search Report for corresponding International PCT Application No. PCT/IB2013/051018, dated Jun. 19, 2013.

* cited by examiner

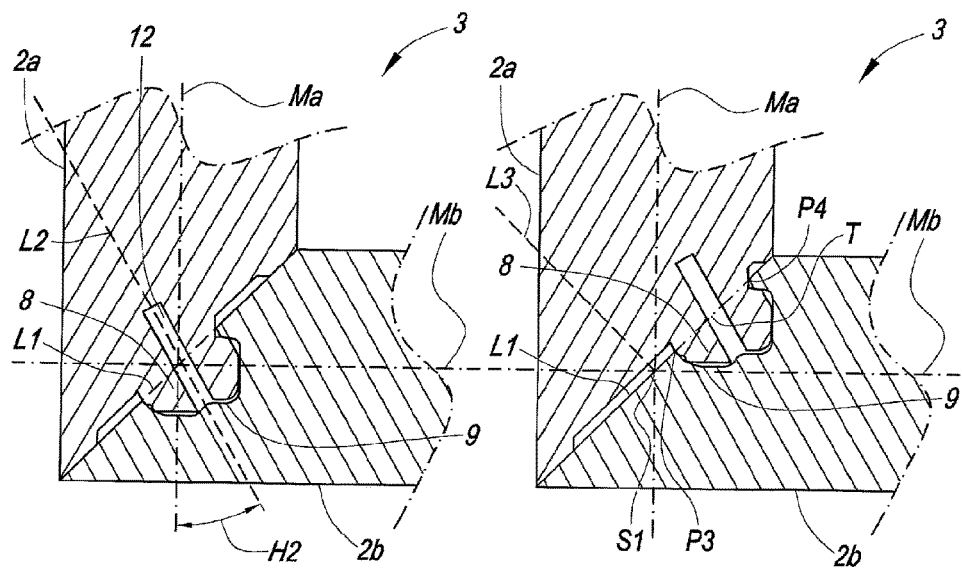
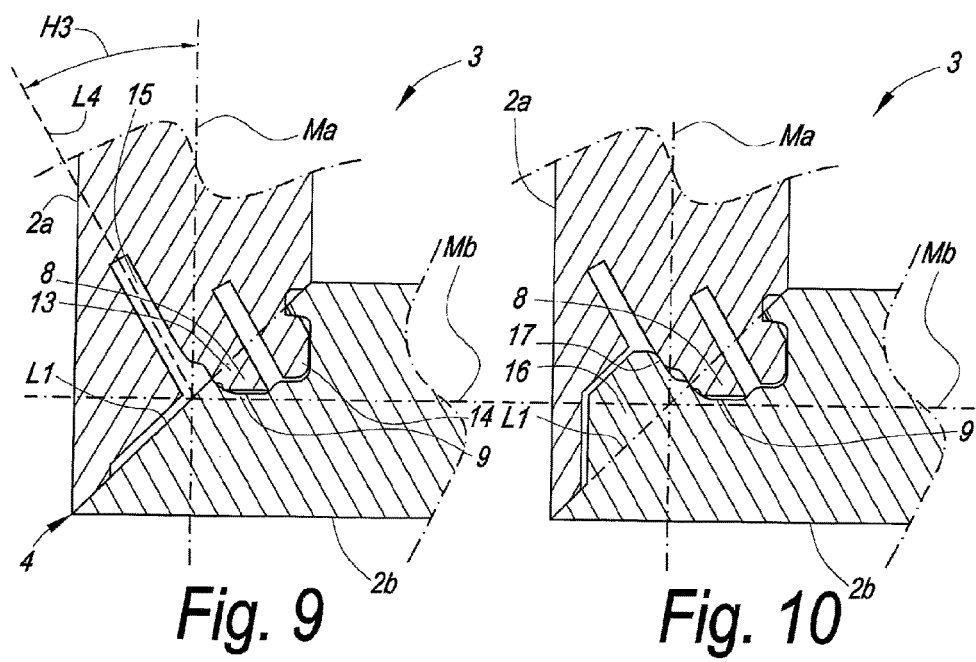

COMPOSED ELEMENT AND CORNER CONNECTION APPLIED HEREWITH

BACKGROUND

1. Field of the Disclosure

This invention relates to a composed element consisting of at least two panel-shaped elements, as well as to a corner connection applied thereby.

In particular, the invention relates to a composed element, which comprises at least two panel-shaped elements, which are coupled to each other or can be coupled to each other at an angle. Herein, the invention relates to any form of composed element which comprises at least two panel-shaped elements, irrespective of the field of application. It is noted that the composed elements does not have to consist exclusively nor substantially of panel-shaped elements, however, that it suffices that the panel-shaped elements possibly only form a part thereof.

More particularly, the invention relates to panel-shaped elements, which can be coupled to each other by means of a locking tongue and groove connection, in particular by moving the panel-shaped elements laterally towards each other and by coupling them by means of a turning movement and/or snap movement to each other at an angle. Moving the panel-shaped elements laterally towards each other means that these panel-shaped elements are presented sideways to each other with their respective panel edges.

Primarily, the present invention is intended for being applied in the furniture sector, wherein the composed element consists of a piece of furniture or of a furniture component. More particularly, the present invention can be applied for composing loose furniture as well as built-in furniture, such as, for example, kitchen furniture, dressing furniture and the like, as well as for furniture components, such as drawers. The invention is in particular suitable for being applied with furniture which is sold in dismantled condition and has to be assembled and/or installed by the buyer or possibly by an installer. This type of furniture is also known under the denomination flat pack furniture or as RTA furniture. Herein, RTA stands for "Ready To Assemble". It is noted that the present invention can also be used in any other application, such as, for example, for wall panels, storage boxes, coffins and the like.

More particularly, the invention aims at a composed element, such as explained herein above, and a corner connection between panel-shaped elements applied hereby, which can be assembled and realized in a simple and smooth manner.

2. Related Art

More particularly, the invention relates to a composed element of the type which comprises two or more panel-shaped elements, which each possess coupling parts in the form of a tongue and a groove, respectively, wherein these coupling parts allow that the panel-shaped elements can be coupled to each other in a locking manner and at an angle. In this context, this is referred to as a mechanically locking coupling system, more particularly a locking tongue and groove connection. Further, this locking tongue and groove preferably are present in the form of a profile respectively extending in the longitudinal direction of the panel-shaped element. A composed element which makes use of such tongue and groove connection is known, amongst others, from WO 2010/070605.

Substantially, there are two types of corner connections. A first type of corner connection, in this context described as a common corner connection, relates to a connection wherein, in the longitudinal direction of the formed corner, the panel edge of one of the two panel-shaped elements coupled at an angle remains completely visible after they have been brought into the coupled condition. A second type of corner connection relates to a connection wherein the panel-shaped elements are brought together in miter at their respective panel edge. In this case, this is also called a miter coupling or a mitered corner connection. Herein, the panel edges of the two panel-shaped elements in the longitudinal direction of the formed corner are not visible or visible in a limited manner only, when they were brought into coupled condition. In certain applications, it is more desirable to work with a miter coupling instead of a common corner connection, for esthetical reasons.

In the field of esthetics, a miter coupling has some important advantages in respect to a common corner connection. By working with a miter coupling, a more solid impression is obtained. Further, this also gives an impression of handcraft or at least of a more precise finishing of the composed element. Technically seen, by making use of a miter coupling, it is avoided or restricted that the panels have to be masked along the side of the miter coupling by means of a relatively wide masking strip, such as, for example, a laminate strip or a masking strip of synthetic material, for example, an ABS strip (Acrylonitrile-butadiene-styrene). By means of a miter coupling, the use of the masking strip can be avoided, or a narrower masking strip can be used.

From WO 2010/070605, couplings are known for common corner connections as well as for mitered corner connections. WO 2010/070605 shows a profile for a mitered coupling in FIG. 66.

The present invention aims at an improvement of, or an alternative for, the already known profile for mitered coupling from WO 2010/070605, wherein the coupling system preferably is improved in the field of stability and strength of the composed element, as well as in the field of ease of installation, more particularly of the joining together of the component panels.

In fact, it is clear that such couplings, during assembly or coupling as well as afterwards, are subjected to forces. These forces originate from the own weight of the composed element, as well as from possible external loads to which the composed element is subjected. Considering that the profiles, however, mostly have to be realized in relatively thin panels, and moreover typically, however, not exclusively, are made in particle board, which, as known, can be relatively brittle, it is important to perform an innovating optimization on the applied profiles.

SUMMARY

The present invention thus primarily aims at possibilities for optimizing such miter couplings.

To this aim, the present invention, according to a first independent aspect, relates to a composed element, which comprises at least two panel-shaped elements, each with respective panel surfaces, wherein for each panel-shaped element a center line is defined centrally between the two panel surfaces of that panel-shaped element; wherein said panel-shaped elements are manufactured of wood-based material; wherein said panel-shaped elements can be coupled to each other at an angle by means of a locking tongue and groove connection and hereby respectively form an inner and outer corner, wherein the inner and outer corner define a theoretical miter line; wherein said locking tongue and groove connection respectively is substantially formed of a tongue on one of said panel-shaped elements, of a groove on another of said panel-shaped elements and of locking elements provided on said tongue and groove; wherein, seen in cross-section, the panel surface of each panel-shaped element at the side of said outer corner extends at least to the center line of the panel-shaped element to which it is coupled; wherein the tongue consists of a split tongue, with thus at least a first tongue portion and a second tongue portion, as well as a slit situated there between; with the characteristic that said slit, seen in cross-section, globally extends according to a direction which deviates from the direction of the center line of the panel-shaped element on which the tongue is provided. By making use of a slit which, seen in cross-section, extends according to a direction which deviates in respect to said center line, in other words, a slit which extends at an angle in respect to said center line, the locking tongue and groove connection can be optimized in the field of the strength of the locking between two panel-shaped elements in coupled condition, on the one hand, and in the field of the force necessary for bringing two panel-shaped elements in coupled condition according to a certain direction, on the other hand. A suitable orientation of the slit provides for an orientation of the flexibility of the tongue adapted to the manner of assembly. By applying such slit, a freedom of design is created according to which the coupling can be optimized for any type of application, such by suitably configuring and dimensioning the slit.

The locking elements provided on the tongue and groove provide for that in a usual mutually coupled condition, the moving apart of the respective panel-shaped elements is counteracted. More particularly, the moving apart with a translation movement at least according to a direction of the center lines of the respective panel-shaped elements and according to a direction perpendicular to the theoretical miter line is counteracted by these locking elements.

According to a preferred characteristic of the first aspect of the invention, said slit in the tongue, towards the open end, is directed inclined towards the respective panel surface situated on the inner corner of the aimed-at miter coupling. Herein, the axis line through the slit in the tongue encloses an angle which is larger than 0° and smaller than 90° and preferably is smaller than the miter angle with the center line of the panel-shaped element having the tongue. Herein, the miter angle is the angle which is enclosed by the center line of the panel-shaped element having the tongue and the theoretical miter line of the miter coupling. By directing the slit in the tongue, as described herein above, inclined towards the panel surface at the side of the inner corner, it is obtained that the orientation of the flexibility of the tongue is adapted to the manner in which the panels are coupled.

It is clear that the tongue, too, globally seen, preferably extends inclined towards the respective panel surface which is situated at the inner corner.

According to another preferred characteristic of the first aspect, the tongue is situated eccentric in respect to the midpoint of the theoretical miter line, such preferably in the direction of said inner corner. Due to the eccentric arrangement of the tongue, more material can be kept on the outer corner, which leads to a sturdier construction and therefore a diminished risk of a breaking-off of material portions. In the case of a panel-shaped element with a covering, such as, for example, a laminate covering, an eccentric arrangement may contribute to a better resistance against warping of the panel-shaped element at the location of the outer corner as a result of tensile stress in the covering, such that the risk of a poor connection of the panel-shaped elements on the location of the outer corner can be restricted. Tensile stresses in the covering, in the example of a laminate covering, can occur under the influence of temperature and temperature differences during and after the production process. Hardening the resin present in the laminate, for example, is accompanied by a shrinkage which is larger than the possible deformation of the underlying material of the basic board of the panel-shaped elements. Further, an eccentric arrangement of the tongue allows obtaining, during assembly, an improved turning movement of the tongue in the groove.

According to a further preferred characteristic of the first aspect of the present invention, said tongue is cut free on at least one side, preferably by means of a cut, more particularly by means of a narrow incision. By a narrow incision, an incision is meant having a depth which is larger than the width. By cutting the tongue free on at least one side, the tongue or the adjacent tongue portion can be rendered more elastic. This latter allows optimizing the coupling even further by making a compromise between the strength of the locking between two panel-shaped elements in coupled condition, on the one hand, and the force required to bring two panel-shaped elements in coupled condition, on the other hand.

Still more particularly according to the first aspect of the invention, it is preferred that the tongue is cut free on one side only, preferably on the side of the tongue situated closest to the formed outer corner. By cutting the tongue free on one side only, it is prevented that the tongue would be too sensitive and becomes less resistant against breaking-off. The preference of cutting a tongue free on the side situated closest to the formed outer corner is primarily important when this characteristic is combined with an eccentric tongue, wherein the tongue is situated closer to the inner corner than to the outer corner.

According to a preferred embodiment of the first aspect of the invention, the aforementioned locking elements are present at the height of one side of the tongue only, whereby at the other side of the tongue, this latter is free from locking elements. This characteristic allows that the panel-shaped element having the tongue can be turned into the corresponding panel-shaped element having the groove in a beneficial manner, or in other words the respective panel-shaped elements can be turned into each other. According to a particular deviating embodiment, in fact locking elements can be present at the height of the other side of the tongue, however, these last-mentioned locking elements are less pronounced than the locking elements situated at the height of the first side of the tongue.

According to another preferred characteristic of the first aspect of the invention, said groove, on at least one side thereof, seen in cross-section, is bordered by a lip extending to beyond said theoretical miter line, seen from the panel-shaped element having the groove, which lip is called a protruding lip herein below. This aspect of the invention offers the advantage that a contact surface can be formed between the tongue and the groove beyond the theoretical miter line. In coupled condition, such contact surface can provide for an improved support of the tongue and in this way contribute to an improved locking of the panel-shaped elements. In this case, as well as in the herein below described applications, the term "contact surface" has to be interpreted in its broadest sense as a zone where a contact can take place, wherein such zone, seen in cross-section, can extend over a distance as well as can consist of a local contact point.

Herein, it is preferred that said protruding lip is located at the side which is situated closest to the formed outer corner. Further, at the height of this protruding lip at least one contact surface shall be formed between the tongue and the groove. In coupled condition of the panel-shaped elements, this contact surface will provide for a support of the tongue which is effective at least according to the direction perpendicular to the center line of said panel-shaped element having the tongue.

According to still another preferred characteristic of the first aspect of the invention, said protruding lip in coupled condition forms two contact surfaces with the tongue which provide for a support which is effective at least according to the direction perpendicular to the center line of said panel-shaped element with said tongue.

According to the first aspect of the invention, it is preferred that at least one of said contact surfaces is situated beyond the theoretical miter line at the side of the panel-shaped element having the tongue. This aspect of the invention offers the advantage of offering additional strength to the formed mitered corner connection.

It is clear that in respect to the first aspect of the present invention, the preceding characteristics do not exclude that also on the other side of the groove, which is situated closest to the formed inner corner, a protruding lip can be present.

More particularly, in respect to the first aspect of the invention, it is of interest to provide, at the side of the groove which is situated closest to the formed inner corner, a smaller protruding lip portion, wherein the panel surface of the panel-shaped element having the groove continues at the height of the inner corner beyond the theoretical miter line, seen from the panel-shaped element having the groove, as a result of which at that location a contact surface is formed which coincides with a portion of said panel surface.

According to a second independent aspect, the invention relates to a composed element, which comprises at least two panel-shaped elements, each with respective panel surfaces, wherein for each panel-shaped element a center line is defined centrally between the two panel surfaces of that panel-shaped element; wherein said panel-shaped elements are manufactured of wood-based material; wherein said panel-shaped elements can be coupled to each other at an angle by means of a locking tongue and groove connection and hereby form an inner and outer corner, wherein the inner and outer corner define a theoretical miter line; wherein said locking tongue and groove connection respectively is formed substantially of a tongue on one of said panel-shaped elements, of a groove on another of said panel-shaped elements and of locking elements provided on said tongue and groove; wherein, seen in cross-section, the panel surface of each panel-shaped element on the side of said outer corner extends at least to the center line of the panel-shaped element to which it is coupled; with the characteristic that said groove, on at least one side thereof, seen in cross-section, is bordered by a lip which extends to beyond said theoretical miter line. Said lip is also called protruding lip. This aspect of the invention offers the advantage that a more robust embodiment is obtained and/or that particular contact surfaces can be formed between the panel-shaped elements to be coupled. More particularly, by applying a protruding lip, a contact surface can be formed between the tongue and the groove beyond said theoretical miter line, seen from the panel-shaped element having the groove. In coupled condition, such contact surface can provide for an improved support of the tongue and in this manner contribute to an improved locking of the panel-shaped elements.

According to a preferred characteristic of the second aspect of the invention, said protruding lip preferably is situated at the side of the groove which is situated closest to the formed outer corner. Further, at the height of this protruding lip at least one contact surface is formed between the tongue and the groove. In coupled condition, this contact surface can provide for a support of the tongue which is effective at least according to the direction perpendicular to the center line of said panel-shaped element having the tongue.

According to another preferred characteristic of the second aspect of the invention, said protruding lip, in coupled condition, forms two contact surfaces with the tongue, which provides for a support which is effective at least according to the direction perpendicular to the center line of said panel-shaped element having the tongue.

According to still another preferred characteristic of the second aspect of the invention, it is preferred that at least one of said contact surfaces is situated beyond the theoretical miter line at the side of the panel-shaped element having the tongue. This characteristic offers the advantage of offering additional strength to the formed mitered corner connection.

It is clear that also in respect to the second aspect of the present invention, the aforementioned characteristics do not exclude that on both sides of the groove a lip can be present which extends to beyond said theoretical miter line.

More particularly, it is also in respect to the second aspect of the invention of interest to provide, at the side of the groove situated closest to the formed inner corner, a smaller lip, which extends to beyond the theoretical miter line, wherein the panel surface of the panel-shaped element having the groove continues at the height of the inner corner beyond the theoretical miter line, as a result of which at that location a contact surface is formed, which coincides with a portion of said panel surface.

According to a third independent aspect, the invention relates to a composed element, which comprises at least two panel-shaped elements, each with respective panel surfaces, wherein for each panel-shaped element a center line is defined centrally between the two panel surfaces of that panel-shaped element; wherein said panel-shaped elements are manufactured of wood-based material; wherein said panel-shaped elements can be coupled to each other at an angle by means of a locking tongue and groove connection and hereby form an inner and outer corner, wherein the inner and outer corner define a theoretical miter line; wherein said locking tongue and groove connection respectively is formed substantially of a tongue on one of said panel-shaped elements, of a groove on another of said panel-shaped elements and of locking elements provided on said tongue and groove; wherein, seen in cross-section, the panel surface of each panel-shaped element at the side of the formed outer corner extends at least to the center line of the panel-shaped element to which it is coupled; with the characteristic that said tongue is cut free on at least one side, preferably by means of an incision, more particularly by means of a narrow incision. By cut free is meant freed from still present surrounding material of the respective panel-shaped element. By a narrow incision, an incision is meant having a depth which is larger than the width. By cutting the tongue free on at least one side, the tongue or the adjacent tongue portion can be rendered more elastic. This latter allows optimizing the coupling even further in the field of the strength of the locking between two panel-shaped elements in coupled condition, on the one hand, and force required for bringing two panel-shaped elements into coupled condition, on the other hand.

Still more particularly according to the third aspect of the invention, it is preferred that the tongue is cut free on one side only, preferably on the side of the tongue situated closest to the formed outer corner. By cutting the tongue free on one side only, it is prevented that the tongue would be too sensitive and less resistant against breaking-off. The preference of cutting a tongue free on the side situated closest to the formed outer corner is primarily important when this characteristic is combined with an eccentric tongue, wherein the tongue is situated closer to the inner corner.

It is noted that all aforementioned aspects of the invention can be combined at choice, inasmuch as they do not show any contradictory characteristics. Also, all subordinate characteristics, which are described by means of the first, second and third aspect, can be combined therewith, this inasmuch as such combinations do not result in contradictory characteristics.

Below, some preferred additional characteristics of the present invention will be listed, which can be applied in combination with any of the preceding described aspects of the invention or of the above-mentioned combinations of aspects and/or subordinate characteristics.

According to an important preferred characteristic, the tongue and the groove have such a profile that they can be brought in a mutually coupled condition by means of a turning movement as well as a translation movement towards each other. This characteristic offers the advantage that assembling or constructing the composed element can be performed in a smooth and/or simple manner.

According to another preferred characteristic, the tongue and groove have such a profile that they can be brought into a mutually coupled condition by means of a translation movement according to a direction which is directed inclined in respect to the center line and preferably according to the direction of the slit of the tongue or according to a direction transverse, perpendicular or approximately perpendicular to the theoretical miter line. This characteristic offers the advantage that the flexibility of the tongue is adapted to the manner in which the composing panel-shaped elements are brought together during the assembly.

According to another preferred characteristic, the tongue and groove have such a profile that the panel-shaped elements can be brought in a stable intermediate position which differs from the final coupled condition. This stable intermediate position corresponds to a first easy locking, by which the panel-shaped elements during assembly remain coupled when released. Possibly, the panel-shaped elements can easily be loosened again starting from this intermediate position. Of course, starting from this intermediate position the panel-shaped elements can be locked further and brought in the final coupled condition.

According to a further preferred embodiment, the tongue and/or the groove are formed by profiles which are provided in the panel-shaped elements themselves, and preferably they are realized in one piece in the respective panel-shaped element, for example, by means of a cutting treatment and/or machining treatment, such as a milling treatment. This offers the advantage that no separate elements are necessary for connecting the panel-shaped elements at an angle. Another advantage thereof consists in that such profiles can be milled into the panel-shaped elements in a simple manner and a continuous locking tongue and groove connection can be realized smoothly along the entire corner connection.

Preferably, the tongue and/or groove are formed of the material of the basic board with which the panel-shaped element is formed. This offers an important advantage for the manner of production of the panel-shaped elements of the composed element.

However, this does not exclude that according to a particular embodiment the locking tongue and groove connection can make use of a contact surface formed by an insert and/or of a locking element which is realized as an insert, wherein said insert respectively is provided in an edge of one of the panel-shaped elements. More specifically, such insert may consist of a strip which is movable or is provided of a movable part with a contact surface or locking portion which can cooperate with a tongue or groove formed on the other panel-shaped element, a locking element formed on the other panel-shaped element, respectively.

According to a possible embodiment, the tongue and the groove have locking elements at the height of the two sides of the tongue. However, according to a further preferred embodiment of the present invention, the locking elements, at the height of the side of the tongue which is located closest to the formed outer corner, are less pronounced than the locking elements at the height of the tongue which is located closest to the inner corner.

According to another preferred embodiment, the composed element comprises the characteristic that the panel-shaped elements comprise one or more incisions, such as said slit in the tongue or such as said incision at one side of the tongue, wherein at least one of the aforementioned incisions is partially or entirely filled with an elastically deformable material. This characteristic of the present invention can contribute to an elasticity of the tongue or of the individual tongue portions, which elasticity is adapted to the application and to the final embodiment. Also, providing an elastically deformable material or a filler can contribute to an improved resistance of the panel-shaped elements against damage; more particularly an improved resistance against damage of the tongue profiles.

According to a possible preferred embodiment, the composed element shows the characteristic that the panel surface of each panel-shaped element, seen in cross-section, at the side of the formed outer corner, extends up to a small distance from said outer corner, more particularly a distance smaller than ¼ of the panel thickness of the panel-shaped element to which it is coupled, still better up to a distance smaller than ⅙ of the panel thickness of the panel-shaped element to which it is coupled. This characteristic has the advantage that the panel-shaped elements can come together at the outer corner according to a closing plane which possibly deviates from the theoretical miter line of the formed miter coupling. This allows achieving a better protection of the tongue profile. According to a possible embodiment, said panel surface extends right up to said outer corner.

According to a possible preferred embodiment, the composed element shows the characteristic that it can receive a separately applied corner element at the height of one or more of said formed inner or outer corners. This characteristic allows giving an appropriate appearance to the composed element by working with separate corner elements, which have an appropriate appearance and/or possibly have improved mechanical features. The separately applied corner element can have a rounded shape, as a result of which the composed element adopts a rounded shape at the height of the inner and/or outer corner. The composed element may also obtain improved mechanical features at the height of the inner and/or outer corner by working with separately applied corner elements of an appropriate material, such as, for example, metal or synthetic material, more in particular, for example, a corner element substantially manufactured of rubber or stainless steel or any other appropriate material.

According to a possible preferred embodiment, the composed element shows the characteristic that the panel surface of the panel-shaped element having a groove on the side of the formed inner corner continues at the height of this inner corner to beyond the theoretical miter line, as a result of which a contact surface is formed at this place, which coincides with a portion of said panel surface. This characteristic has the advantage that hereby the assembly of the panel-shaped elements can be simplified further, for example, in that this contact surface forms a support surface during the turning-in of the panel-shaped element having the tongue.

According to a deviating embodiment, the composed element shows the characteristic that the panel surface of each panel-shaped element on the side of the formed outer corner, seen in cross-section, instead of extending at least to the center line of the panel-shaped element to which it is coupled, extends up to a distance from said outer corner which is smaller than ¾ of the panel thickness of the panel-shaped element to which it is coupled.

It is noted that in the case that a slit in the tongue is applied, the location, width, depth and orientation of this slit form degrees of freedom in the design of a composed elements and the corner connections applied therewith according to one or more aspects of the present invention. The location, and to a certain extent the orientation, too, determine the thickness ratio between the two tongue portions formed in this manner. To this aim, the thickness of the tongue portions can be determined at the height of the theoretical miter line. This ratio can be chosen as a design parameter for the applied corner connections according to one or more aspects of the present invention and can be optimized in function of the type of load which is expected for each panel-shaped element of the composed element. The thickness of each tongue portion in fact determines the flexibility of the respective tongue portion, whereas each tongue portion contributes to different components of the locking forces of the locking tongue and groove connection.

The width, depth and orientation of the slit in the tongue substantially determine the flexibility of the two tongue portions. These three parameters can be applied for searching, per selected basic material of which the panel-shaped elements are composed, an optimum between the strength of the locking between two panel-shaped elements in coupled condition, on the one hand, and force required for bringing two panel-shaped elements into coupled condition. In other words, a compromise between ease of installation and stability of the finally formed composed element.

Further, it is also noted that in the case that the tongue is cut free, the width, depth and orientation of the incision on the exterior of the tongue substantially determine the flexibility of the tongue or adjacent tongue portion. These three parameters can be applied again for searching, per chosen basic material of which the panel-shaped elements are composed, an optimum between the strength of the locking, on the one hand, and the force required for bringing two elements into coupled condition.

According to a particular embodiment, the invention relates to a composed element according to any of the preceding aspects, wherein said groove, seen in cross-section, is bordered on at least one side thereof by a lip which, at least with a portion thereof, is located beyond said theoretical miter line, and wherein this lip in coupled condition is located at the side of the tongue situated closest to the formed outer corner, with the further characteristic that said portion provides at least a contact surface for the tongue. In this manner, a robust coupling is obtained. According to possibilities subordinate thereto, which may or may not be combined with each other, the composed element further is characterized:

in that the lip has a distal end which extends up to the plane of the panel-shaped element in which the groove is provided and which is situated on the inner corner and preferably is formed by a portion of the inner wall of the panel-shaped element;

in that the panel which is provided with the tongue comprises a protruding edge portion which, at the exterior, provides for a prolongation of the panel surface and which is situated, at the inner side, opposite to said portion of the lip and preferably adjoining thereto, wherein this protruding edge portion extends at least up to the center line of the panel-shaped element which comprises the groove, and preferably up to the actual outer corner.

According to a particular embodiment of the last-mentioned of said two possibilities, the protruding edge portion, in the proximity of its distal end, comprises a locking part, which in coupled condition engages behind the other panel-shaped element, by which is prevented that this edge portion can deform, for example, can warp after a certain time.

According to a particular embodiment, the invention relates to a composed element according to any of the aforementioned aspects, wherein the tongue consists of a split tongue, with a slit, which, seen in cross-section, globally extends according to a direction which deviates from the direction of the center line of the panel-shaped element on which the tongue is provided, with the further characteristic that the slit, globally seen and/or with the wall thereof situated closest to the inner corner, extends from the free end thereof towards the bottom inclined towards the panel surface which is located at the inner corner.

According to a fourth independent aspect, the invention relates to a composed element, which comprises at least two panel-shaped elements, each with respective panel surfaces, wherein for each panel-shaped element a center line is defined centrally between the two panel surfaces of that panel-shaped element;

wherein said panel-shaped elements preferably are manufactured of wood-based material;

wherein said panel-shaped elements can be coupled to each other at an angle of 90 degrees or approximately 90 degrees by means of a locking tongue and groove connection and herein respectively form an inner and outer corner, wherein the inner and outer corner define a theoretical miter line;

wherein said locking tongue and groove connection substantially is formed of a tongue on one of said panel-shaped elements, of a groove on another of said panel-shaped elements and of locking elements provided on said tongue and groove, respectively;

wherein, seen in cross-section, the panel surface of each panel-shaped element at the side of the formed outer corner extends at least up to the center line of the panel-shaped element to which it is coupled;

wherein the tongue preferably consists of a split tongue, with thus at least a first tongue portion and a second tongue portion, as well as a slit situated there between;

with the further characteristic that said tongue, at the location of the theoretical miter line, is located entirely outward of the midpoint of the theoretical miter line, such between the midpoint and the inner corner. According to this aspect, a connection is obtained which can be smoothly turned into each other and wherein the material of the panel-shaped elements is situated relatively far from the coupling parts, as a result of which possible deformations, which may occur during the joining together at the height of the coupling parts, do not have any influence on the material at the outer corner.

According to a fifth independent aspect, the invention relates to a composed element or collection of composed elements, wherein each composed element comprises at least two panel-shaped elements, each with respective panel surfaces;
- wherein said panel-shaped elements preferably are manufactured of wood-based material;
- wherein said panel-shaped elements can be coupled to each other at an angle by means of a locking tongue and groove connection and thus form a corner connection;
- wherein said locking tongue and groove connection substantially is formed of a tongue on one of said panel-shaped elements, of a groove on another of said panel-shaped elements and of locking elements provided on said tongue and groove, respectively;

with the further characteristic that in such composed element as such, or in a collection of such composed elements, at least two of such corner connections are present, however, wherein at the one corner connection panel-shaped elements are applied of which at least one panel-shaped element has a panel thickness which differs from the panel thicknesses of the other corner connection; and that on both corner connections a tongue and groove connection is applied, which are realized by means of tongue and groove profiles which, in respect to at least the tongue profile and/or the groove profile, are identical to each other. By a "collection", herein primarily a furniture collection has to be understood, thus, furniture which are intended to belong together, or a furniture collection, for example, RTA furniture collection, from which different pieces of furniture can be constructed. By using tongue and groove profiles which are identical, irrespective of the differences in panel thickness, the advantage is obtained that at least for these profiles use can be made of the same cutting tools, for example, milling cutters. The edge portions which are located outside of the tongue and groove profiles are of a simpler form and possibly are easier to adapt to the different panel thicknesses. Depending on the design of these edge portions, these mutually possibly can also be realized by means of the same profiling tools.

It is clear that the fifth aspect can be applied with mitered connections as well as with other corner connections.

It is noted that all embodiments of the first to the fifth aspect can be combined at choice, inasmuch as such combination does not comprise any contradictory characteristics. Also, each aspect can be combined with characteristics as such which are described as subordinate to another aspect, this also according to all possible combinations, inasmuch as such combinations do not comprise any contradictory characteristics.

As becomes clear from the aspects described herein above, the invention in most cases relates to composed elements which comprise at least two panel-shaped elements, which are manufactured of wood-based material. However, it is not excluded to apply, according to a deviating variant, the corner connection of the invention in combination with panel-shaped elements which consist of other materials, at least inasmuch as the panel-shaped elements then consist of materials which are suitable and/or typical for being applied in furniture.

The invention shows its advantages best when the material shows one or more of the following characteristics:
- the panel-shaped elements substantially consist of a basic board formed of solid wood;
- the panel-shaped elements substantially consist of a basic board formed of a wood-based pressed board, in particular a MDF, HDF or particle board;
- the panel-shaped elements are formed of melaminated board;
- the panel-shaped elements are formed of multi-layered and/or multi-part board;
- the panel-shaped elements comprise a lightweight board, possibly with edges from another material, wherein such lightweight board consists, for example, of a particle board which is at least partially composed of flax chips and/or which comprises lightweight particles, such as expanded synthetic material particles;
- the panel-shaped elements are constructed as a hollow board or as a board provided with cavities, for example, with a honeycomb core, possibly with edges from another material; the panel-shaped elements are constructed of a basic board with a covering, more particularly a covering of synthetic material or textile.

By multi-layered material a panel-shaped element or panel is intended which is composed of a plurality of thin layers of a same or similar material, such as plywood board, as well as a panel which is composed of a plurality of structural layers, which are formed of a clearly different material, such as, amongst others, sandwich panels.

It is clear that the panel-shaped elements according to the present invention, on the edges extending transverse to the longitudinal direction of the locking tongue and groove connection, can be provided with a masking strip, for example, a laminate strip or a masking strip of synthetic material, for example, an ABS strip. Hereby, the ends of the tongues and grooves in coupled condition can be hidden from view. In the case of the miter coupling according to the present invention, the masking strip can also be cut off with a miter. The cut of the masking strip then will not coincide with the contour of the profiles. Such masking is performed at the factory.

The corner connection according to the invention can be performed, wherein, seen in cross-section, the locking tongue and groove connection shows overlapping contours. Hereby, a so-called clamping tension can be obtained. Hereby, the panels-shaped elements, in their mounted final position, can be connected to each other with a so-called pretension. Herein, the panel-shaped elements come into mutual contact on one or more places. These places are also called contact surfaces. By applying said overlapping contours, it can be provided for that the panel-shaped elements are drawn towards each other with a permanent tension at the height of these contact surfaces.

Further characteristics of the invention will become evident from the detailed description and claims following below.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIGS. 7 to 24 represent different embodiments of a corner connection also according to the present invention;

DETAILED DESCRIPTION OF VARIOUS EMBODIMENTS

Figure 1:
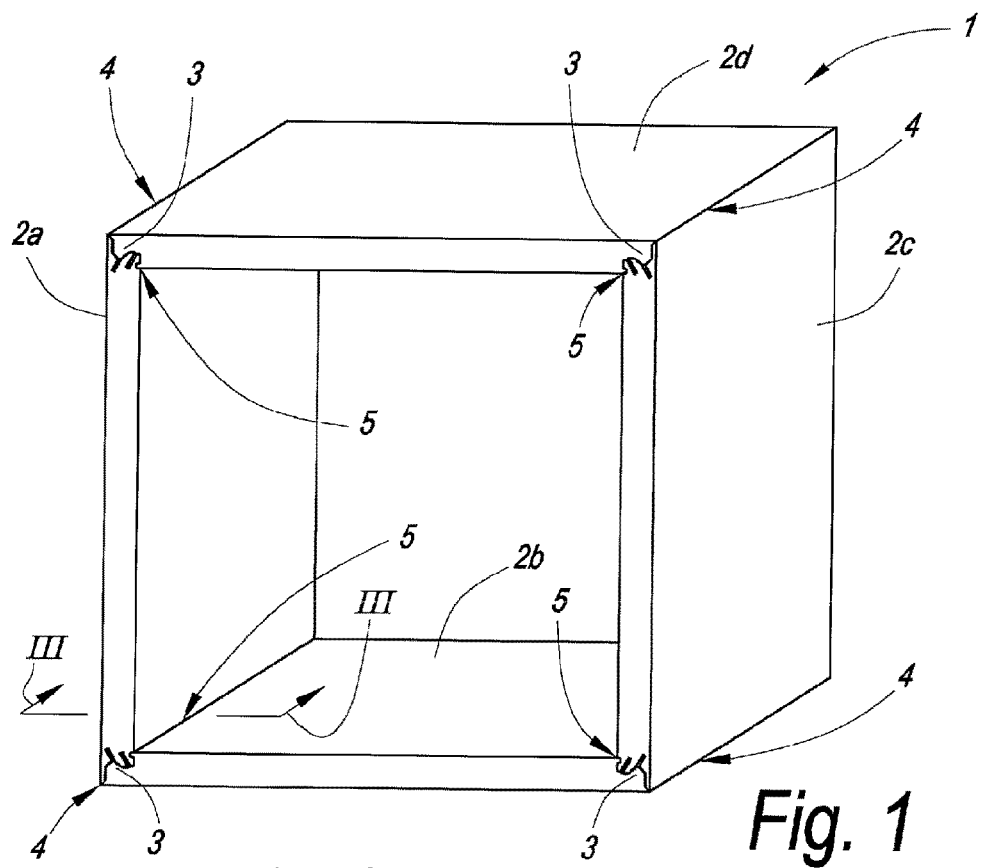
FIG. 1 in perspective represents a composed element according to the invention.

FIG. 1 in perspective shows a composed element 1 according to the present invention. This relates to a possible embodiment of a composed element 1, which in this example consists of four panel-shaped elements 2a, 2b, 2c and 2d, which are manufactured of wood-based material. In the composed element 1 shown, respectively a mitered corner connection is applied between the four composing panel-shaped elements 2a, 2b, 2c and 2d. The panel-shaped elements of which the composed element is constructed, are characterized by the presence of a locking tongue and groove connection 3 with which the panel-shaped elements can be coupled to each other at an angle and hereby form an outer corner 4 and an inner corner 5, respectively. The composed element 1 thus forms a box, wherein the panel-shaped elements 2a, 2b, 2c and 2d form a left-hand sidewall, a bottom wall, a right-hand sidewall and an upper wall, respectively.

Figure 2:
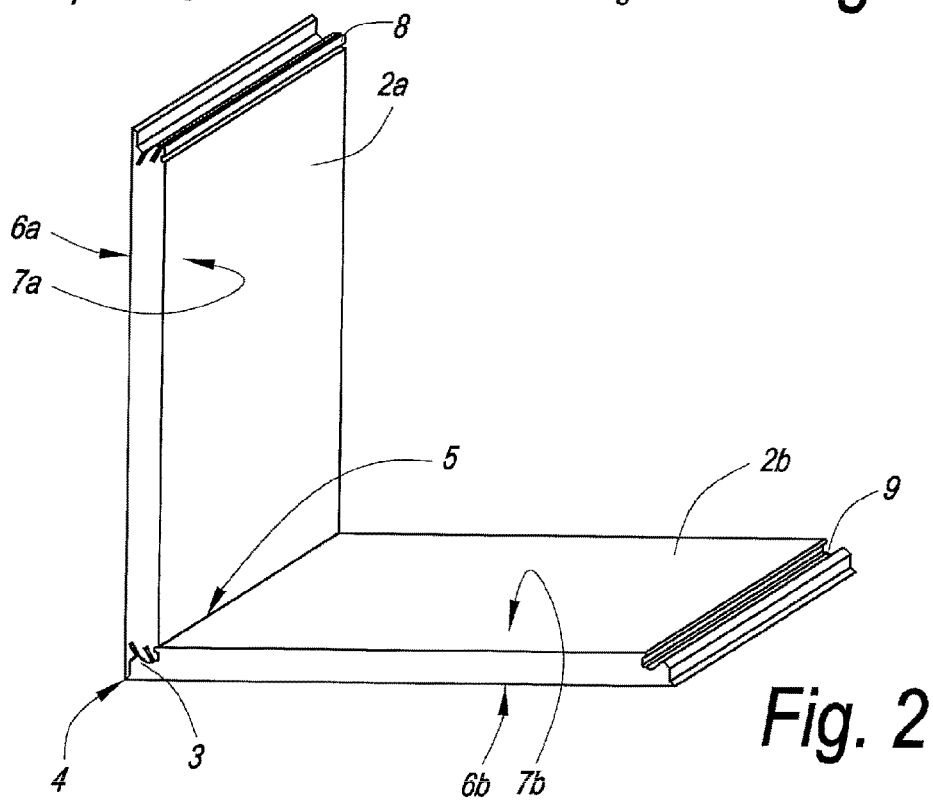
FIG. 2 only represents two panel-shaped elements, connected to each other at an angle, of the composed element of FIG. 1.
Figure 3:
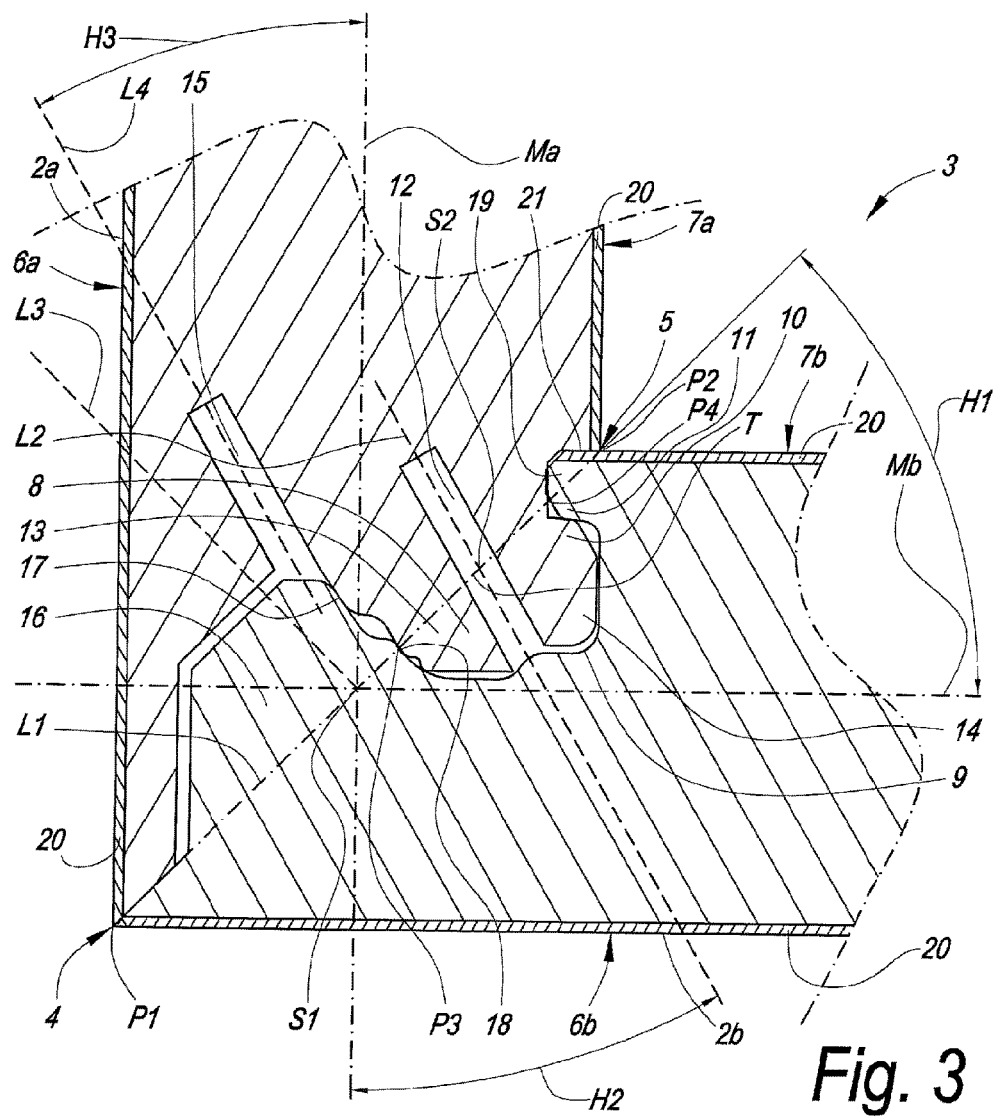
FIG. 3, at a larger scale, represents a cross-section according to line III-III of FIG. 1.

As represented in FIGS. 2 and 3, each panel-shaped element defines two panel surfaces 6a, 7a and 6b, 7b, respectively. Further, each panel-shaped element also defines panel edges, in the case of a rectangular panel-shaped element four panel edges, which extend transverse to said panel surfaces. We are talking about an exterior surface 6a, 6b when a panel surface is situated at the side of a formed outer corner 4 of the corner connection, and we are talking about an interior surface 7a, 7b when a panel surface is situated at the side of a formed inner corner 4. Mostly, as in FIG. 2, too, the formed inner corner 5 between the panel-shaped elements is a right angle. However, according to the present invention, the formed inner corner 5 between the panel-shaped elements possibly may also be an angle different from 90°. Possible embodiments hereof will be described below. In most cases, the panel-shaped elements will show an equal panel thickness. However, the corner connection according to the invention can also be applied with panels of different panel thicknesses. A possible embodiment thereof will also be described herein below. The tongue 8 and groove 9 are made in the form of profiled panel edges. As can be seen in FIG. 2, this relates to uninterruptedly continuing profiles of which the tongue 8 and the groove 9 are composed. However, the tongue 8 and/or the groove 9 can also be made as a discontinuous surface or possibly over only a part of an edge of the panel-shaped element.

In FIG. 3, for both panel-shaped elements 2a and 2b the respective center line is indicated by references Ma and Mb. The center line Ma, Mb of a panel-shaped element 2a, 2b, seen in cross-section, indicates the middle between both panel surfaces 6a, 6b and 7a, 7b of the respective panel-shaped element. Herein, the two respective panel surfaces 6a and 6b, which are situated at the side of the outer corner 4, in coupled condition define a first intersection P1. The two respective panel surfaces 7a and 7b, which are situated at the side of the inner corner 5, herein in an analogous manner in coupled condition define a second intersection P2. The aforementioned theoretical miter line L1 is formed between said two intersections P1 and P2. In some embodiments, still according to the present invention, the panel surfaces of the panel-shaped elements possibly may not continue up to the respective panel surface of the panel-shaped element to which it is coupled. In this case, a theoretical inner corner and/or a theoretical outer corner is determined by the intersection of the respective prolongations of the respective panel surfaces, and the theoretical miter line L1 is defined by this theoretical inner corner and theoretical outer corner. The aforementioned theoretical miter line L1 is represented in FIG. 3 by means of an axis line.

The theoretical miter angle H1 is defined as the smallest angle which extends between the theoretical miter line L1 and a perpendicular on the panel surface 6a at the height of the outer corner 4 of the respective panel-shaped element 2a and as shown in FIG. 3. In the example of FIG. 3, wherein a straight corner connection is shown, said perpendicular coincides with the center line Mb of the panel-shaped element 2b having the groove 9.

As represented in FIG. 3, said locking tongue and groove connection 3 substantially consists of a tongue 8 on one of the aforementioned panel-shaped elements 2a and of a groove 9 on another panel-shaped element 2b. Further, said locking tongue and groove connection 3 is formed by locking elements 10 and 11 provided on said tongue 8 and groove 9, which locking elements, in a common mutually coupled condition of the panel-shaped elements 2a and 2b, counteract the drifting apart of tongue 8 and groove 9.

Further, it is shown in this figure that, seen in cross-section, the panel surface 6a and 6b of each panel-shaped element 2a and 2b at the side of the formed outer corner 4 extends up to beyond the respective center line Mb and Ma of the panel-shaped element 2b and 2a to which it is coupled. More particularly, in the example of FIG. 3 the two panel surfaces 6a and 6b, at the side of the outer corner 4, for both panel-shaped elements 2a and 2b, extend right up to this outer corner 4.

In the example of FIG. 3, the tongue 8 is also provided with a slit 12, as a result of which the tongue is divided into a first tongue portion 13 and a second tongue portion 14.

Said slit 12 in the tongue 8 can be characterized further by an axis line L2, which, seen in cross-section and in the longitudinal direction of the slit 12 in the tongue 8, globally follows the center of this slit 12. Herein below, this axis line L2 is denominated the axis line of the slit L2 and is shown in dashed line in FIG. 3. Hereby, the axis line of the slit L2 also represents the direction of the slit in the tongue. The axis line of the slit L2 and the theoretical miter line L1 of the miter coupling also form an intersection, herein below denominated the intersection S2. Herein below, the tongue slit angle H2 is considered as being the smallest angle which is enclosed between the axis line of the slit L2 and the center line Ma of the respective panel-shaped element 2a having the tongue 8.

In accordance with the first aspect of the invention, the example from FIG. 3 shows the characteristic that said slit 12 globally extends according to a direction which deviates from the direction of the center line Ma of the panel-shaped element 2a on which the tongue 8 is provided. More specifically, in the represented example said slit in the tongue 12 is directed inclined towards the inner corner 5 of the intended miter coupling. By a direction directed inclined towards the inner corner 5 must be understood that the axis line of the slit L2 extends according to a direction wherein the prolongation of the axis line of the slit L2 beyond the bottom of the slit has an intersection with the panel surface 6a at the side of the formed outer corner 4 and thus does not have an intersection with the panel surface 7aat the side of the formed inner corner 5.

According to a preferred characteristic of the present invention, the tongue is arranged eccentrically in respect to the intersection S1 of the center perpendicular L3 with the theoretical miter line L1, such preferably in the direction of said inner corner. For the eccentricity of the tongue, the line portion of the theoretical miter line L1 bordered by the tongue 8 is taken into account. In FIG. 3, this line portion is represented by the line portion P3-P4 and herein below is denominated the tongue line. The points P3 and P4 are the intersections of the contour of the tongue with the theoretical miter line L1. With an eccentric arrangement of the tongue 8, the midpoint T of said tongue line P3-P4 is situated shifted in respect to the intersection S1 of the center lines Ma and Mb of the respective panel-shaped elements 2a and 2b. In FIG. 3, the midpoint of the tongue line P3-P4 is indicated by the point T. Preferably, said intersection S1 of the center lines Ma and Mb is situated entirely outward of said tongue line P3-P4. It is noted that for embodiments in which the tongue 8 is situated entirely along one side of the miter line L1, in other words, the tongue 8 itself does not have any intersections with the theoretical miter line L1, the tongue 8 is considered eccentric when the basis of the tongue 8 is eccentric in respect to the center line Ma of the respective panel-shaped element 2a having the tongue 8.

The example of FIG. 3 also shows the characteristic that said tongue 8 is cut free on one side. It is clear that as a result thereof, the embodiment of FIG. 3 also applies said third aspect of the invention. This cutting free of the tongue 8 took place by means of an incision 15, more particularly by means of a narrow incision 15. By cutting the tongue 8 free on at least one side, the tongue 8 or the adjacent tongue portion 13, 14 can be rendered more elastic. More particularly according to the first aspect of the invention, the tongue 8 is cut free on only one side, here on the side of the tongue 8 which is situated closest to the formed outer corner 4. Said incision 15 further can be characterized by an axis line L4, which, seen in cross-section and in the longitudinal direction of the incision 15, follows the middle of this incision 15. Herein below, this axis line is called the axis line of the incision L4 and is shown in dashed line in FIG. 3. Hereby, the axis line of the incision L4 also represents the direction of the incision. The orientation of the incision now can be characterized by an angle, herein denominated the incision angle H3, formed between said axis line of the incision L4 and the center line Ma, as represented in FIG. 3.

The example of FIG. 3 shows the characteristic that said locking elements 10, 11 are only present at the height of one side of the tongue 8, as a result of which on the other side of the tongue 8, this latter is free from locking elements. This characteristic allows that the tongue can be turned in the corresponding panel-shaped element with groove in an advantageous manner.

The example of FIG. 3 also shows the characteristic that said groove 9, seen in cross-section, on the side situated closest to the outer corner 4, is bordered by a lip which extends to beyond said theoretical miter line L1, denominated the protruding lip 16. This aspect of the invention offers, amongst others, the advantage that a contact surface 17 can be formed between the tongue 8 and the groove 9 beyond the theoretical miter line L1. It is clear that hereby, the embodiment of FIG. 3 forms an example of said second aspect of the invention.

The example of FIG. 3 shows the characteristic that said protruding lip 16 is located on the side which is situated closest to the formed outer corner 4. In coupled condition, said protruding lip 16 forms two contact surfaces 17, 18 with the tongue, which provide for a support which is effective at least according to the direction perpendicular to the center line of said panel-shaped element having said tongue. One of said contact surfaces 17, 18 is situated beyond the theoretical miter line L1, on the side of the panel-shaped element 2a having the tongue 8.

The example of FIG. 3 shows the characteristic that on the side of the groove 9 which is situated closest to the formed inner corner 5, a small protruding lip portion 19 is provided wherein the panel surface 7b of the panel-shaped element having a groove 2b on the side of the formed inner corner 5, at the height of this inner corner 5, continues to beyond the theoretical miter line L1, as a result of which a contact surface 20 is formed there, which coincides with a portion of said panel surface 7b.

Preferably, the panel-shaped elements have a covering on one or on both sides. Such covering may be of any kind and may be realized, for example, in the form of a laminate, for example, of the HPL type or DPL type. Other coverings are to be considered, too, such as, for example, a film, a lacquer layer, which as such may or may not be composed of a plurality of layers. It is noted that in the case of laminate coverings, when manufacturing the panel-shaped elements, preferably from the beginning it is started from a larger board which already is coated or laminated on one or both sides, from which board then the smaller panel-shaped elements will be realized. In FIG. 3, the covering 20 of the panel-shaped element is represented schematically. The thickness of the shown covering 20 does not necessarily correspond to the real thickness. Rather, the covering here is represented schematically only and, for the sake of the clarity of the figure, thicker.

Figure 4:
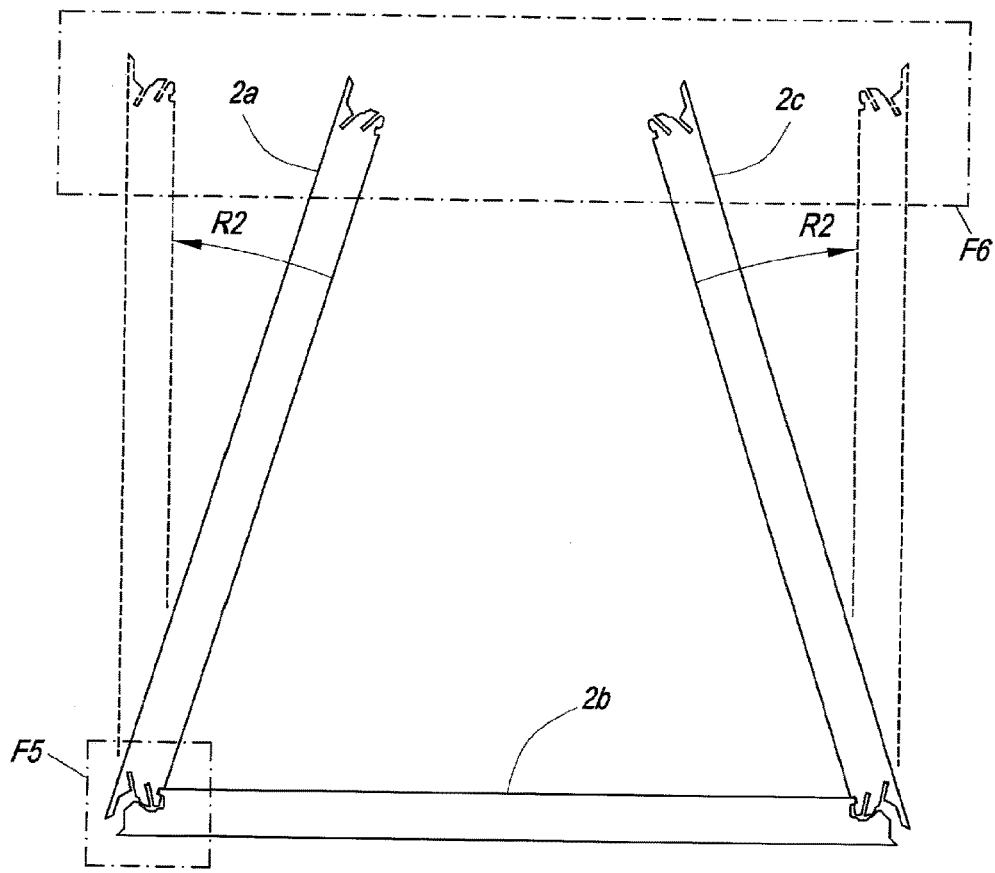
FIG. 4, in a front view, schematically represents the first steps of the assembly of the composed element of FIG. 1.

FIG. 4 schematically and in front view shows the construction of the composed element of FIG. 1. In this figure, it is shown how the two upright panel-shaped elements 2a and 2c of the composed element can be turned in the lower panel-shaped element 2b by means of substantially a rotation or turning movement, respectively. The respective panel-shaped elements 2a and 2c having the tongue, which in the example both have to be turned in, are inserted from an inclined position and subsequently, substantially by means of a turning movement R2, are turned in the panel-shaped element having the groove 2b. Herein, the panel-shaped element, which is provided inclined, respectively is turned towards the final position.

Figure 5:
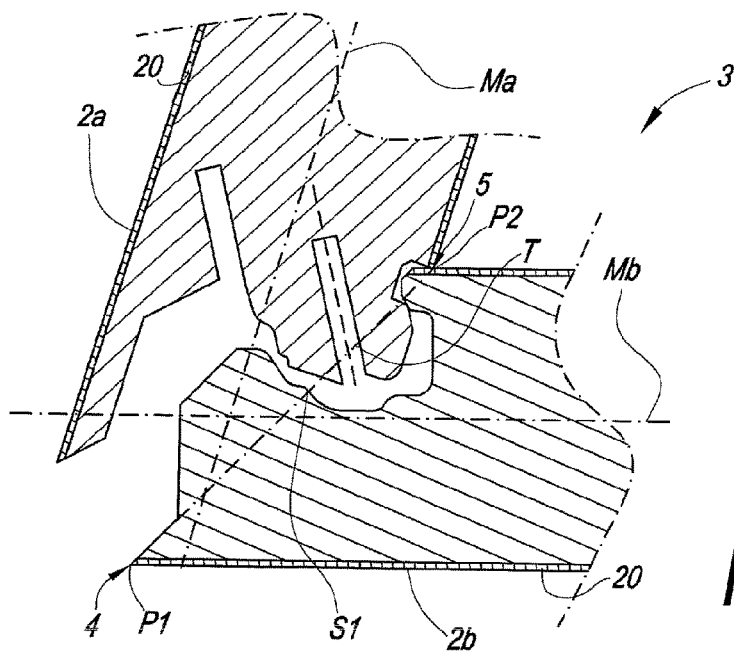
FIG. 5, at a larger scale, represents the portion indicated by F5 in FIG. 4.

In FIG. 5, at a larger scale a detail of the corner connection is represented, as indicated by reference F5 in FIG. 4, wherein the two panel-shaped elements are not yet completely coupled. In this figure, it is shown that the panel-shaped element 2a having the tongue can be turned into the corresponding panel-shaped element with groove by means of a turning movement, possibly in combination with a translation movement.

Figure 6:
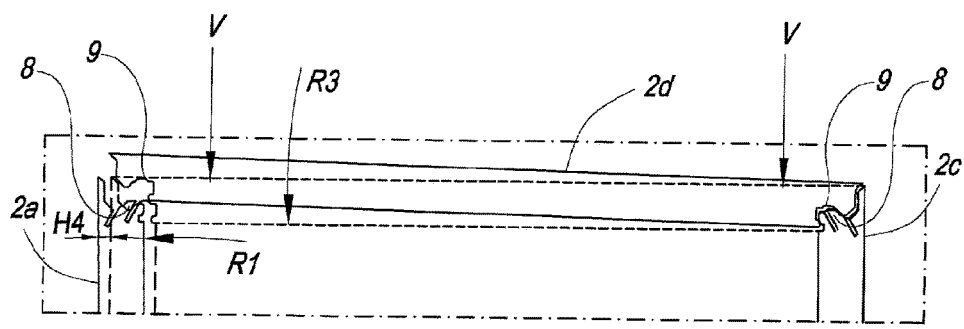
FIG. 6 represents the portion indicated by F6 in FIG. 4, such during the installation of the upper panel-shaped element.

In FIG. 6 is shown how, seen in cross-section, the upper panel-shaped element 2d of the composed element of FIG. 1, in a last step of the assembly, is coupled to the two upright panel-shaped elements 2a and 2c. This is performed by placing the groove 9 of the upper panel-shaped element 2d on one side, for example, the right-hand side, over the tongue 8 of the right-hand panel-shaped element 2c and subsequently placing the other groove 9 of the upper panel-shaped element 2d on the other side, in this example, the left-hand side, over the tongue 8 of the left panel-shaped element 2a. Depending on the chosen embodiment and of the geometry of the tongue 8 and the groove 9, it is possible that the already coupled left and/or right panel-shaped elements 2a, 2c must undergo a very small rotation R1, such that the grooves 9 of the upper panel-shaped element 2d can be brought on both sides over the respective tongue 8 of the left and right panel-shaped element 2a and 2c. In FIG. 6, a possible embodiment of this rotation is represented, wherein the panel-shaped element 2a is brought at an assembly angle H4 in respect to the final vertical position, represented here in dotted line. Finally, the upper panel-shaped element 2d is locked by a downward translation movement V, possibly combined with a rotational movement R3. Depending on the chosen embodiment and of the geometry of the tongue 8 and groove 9, more or less force has to be exerted during this last downward movement V.

In FIGS. 7 to 27, different variants of the locking tongue and groove connection according to the present invention are shown.

In FIG. 7, a locking tongue and groove connection 3 is shown according to the first aspect of the present invention, wherein the tongue 8 has a slit 12, which, seen in cross-section, globally extends according to a direction which deviates from the direction of the center line Ma of the panels-shaped element 2a on which the tongue is provided.

In FIG. 8, a variant of the locking tongue and groove connection 3 is shown, with, in respect to the example of FIG. 7, the additional preferred characteristic that the tongue 8 is eccentric in respect to the intersection S1 of the center perpendicular L3 with said theoretical miter line L1. For the eccentricity of the tongue, the line portion of the theoretical miter line L1, which is bordered by the tongue 8, is taken into account. In FIG. 8, this tongue is represented by the line portion P3-P4. With an eccentric arrangement of the tongue 8, the midpoint T of the tongue line is situated shifted in respect to the intersection S1. Preferably, the midpoint S1 of the theoretical miter line is located outward of said tongue line P3-P4.

In FIG. 9, a variant of the locking tongue and groove connection 3 is shown, with, in respect to the example of FIG. 8, the additional preferred characteristic that the tongue is cut free on one side. This cutting free of the tongue 8 took place by means of an incision 15, more particularly by means of a narrow incision 15. By cutting the tongue 8 free on at least one side, the tongue 8 or the adjacent tongue portion 13, 14 can be rendered more elastic. More particularly also according to the first aspect of the invention, the tongue 8 is cut free at one side only, here at the side of the tongue portion 13 which is situated closest to the formed outer corner 4. The incision 15 further is characterized by an incision angle H3, as represented in FIG. 9.

In FIG. 10, a variant of the locking tongue and groove connection is shown, with, in respect to the example of FIG. 9, the additional preferred characteristic that the groove is bordered on one side by a lip 16 which extends to beyond said miter line. This lip is denominated the protruding lip 16. This second aspect of the invention offers the advantage that a contact surface 17 between the tongue 8 and the groove 9 can be formed beyond the theoretical miter line L1.

Figure 11:
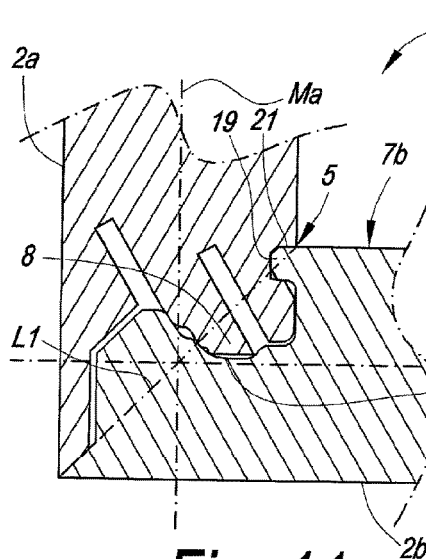

In FIG. 11, a variant of the locking tongue and groove connection is shown, with, in respect to the example of FIG. 10, the additional preferred characteristic that the panel surface 7b of the panel-shaped element 2b having the groove at the side of the formed inner corner 5, continues at the height of this inner corner 5 beyond the theoretical miter line L1, as a result of which at that location a contact surface 21 is formed, which coincides with a portion of said panel surface 7b.

Figure 12:
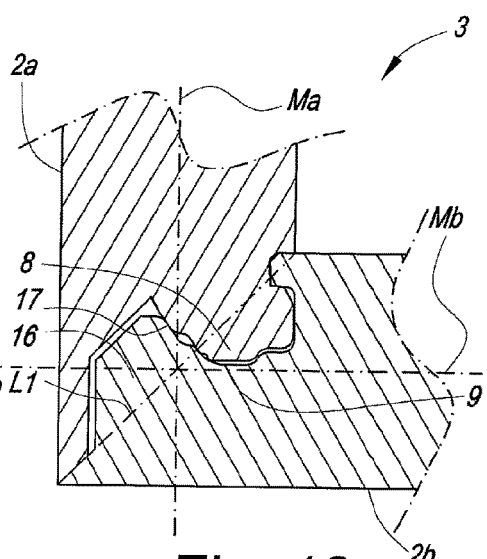

In FIG. 12, a locking tongue and groove connection 3 is shown, according to the second aspect of the present invention, wherein the groove 9 at one side is bordered by a lip 16 which extends to beyond the theoretical miter line, also denominated protruding lip 16.

Figure 13:
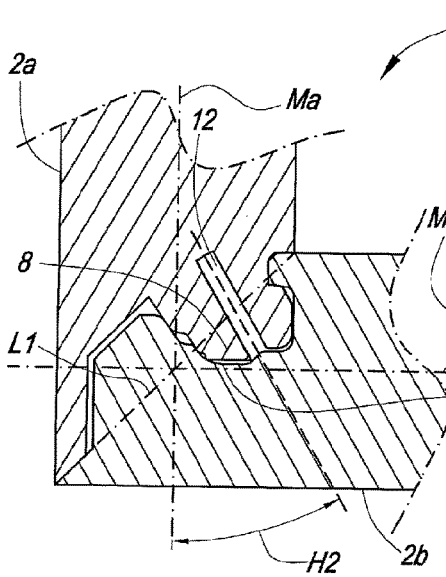

In FIG. 13, a variant of the locking tongue and groove connection 3 is shown, with, in respect to the example of FIG. 12, the additional preferred characteristic that the tongue has a slit 12, which, seen in cross-section, globally extends according to a direction which deviates from the direction of the center line Ma of the panel-shaped element 2a on which the tongue is provided.

Figure 14:
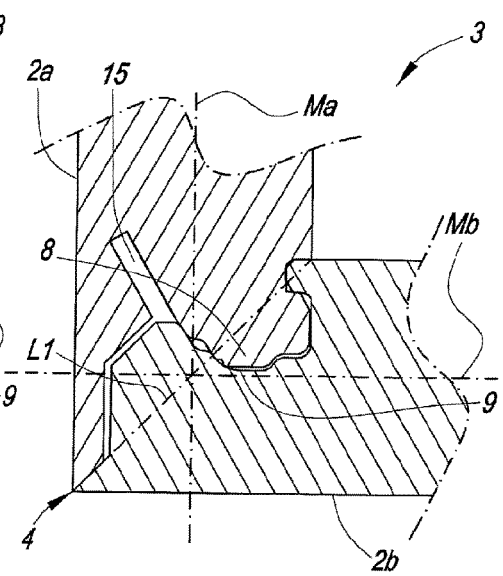

In FIG. 14, a variant of the locking tongue and groove connection 3 is shown, with, in respect to the example of FIG. 12, the additional preferred characteristic that the tongue is cut free at one side. This cutting free of the tongue 8 took place by means of an incision 15, more particularly by means of a narrow incision 15. More particularly also according to the third aspect of the invention, the tongue 8 is cut free at one side only, here at the side of the tongue 4 which is situated closest to the formed outer corner 4.

Figure 15:
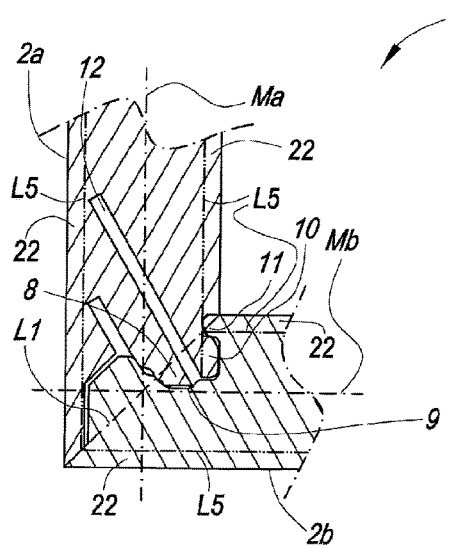

In FIG. 15, an example is shown, wherein, as represented schematically, particle board is used, which comprises a basic layer with coarser particles, in other words, relatively coarse chips, and which, at least on one of the sides thereof, and in this case on both sides thereof, has an outer layer 22 with particles, which in respect to average fineness have a higher degree of fineness than the particles of said basic layer. The separation between the outer layer 22 with high density and the basic layer of the panel-shaped element is indicated in FIG. 15 by a separation line L5 in dash-dotted line. As a particular characteristic, herein the whole is configured such that the locking surface of at least one of the locking elements 10-11, and in this case the locking surfaces of both locking elements, is, are, respectively, situated at least partially in the outer layer 22 or at least in the immediate proximity thereof. More particularly, in the example of FIG. 15, the locking surface of the locking element 10 is situated entirely in the respective outer layer 22 of the respective panel-shaped element 2a, whereas the locking surface of the locking element 11 is situated at a small distance from the respective outer layer 22 of the respective panel-shaped element 2b. Said small distance preferably is no larger than 2 millimeters. In other words, this means in the example that the distance between the locking surface of the locking element 11 to the closely situated separation line L5 of the panel-shaped element 2b is not more than 2 millimeters. By situating such locking surface in such finer outer layer 22, the advantage is obtained that such locking surface is located in the most compact and stable layer, which finally will be beneficial for the strength of the coupling. Moreover, also the advantage is obtained that smoother surfaces can be created in this outer layer, which is of importance for achieving a good coupling function. When such locking surface is situated at a small distance from the outer layer 22, however, the last-mentioned advantage is no longer achieved, but the closely situated outer layer 22 still provides for a strong locking element 11, as then still a sufficient support of the material of the basic layer will be provided.

It is noted that such configuration of one or more locking surfaces in respect to one or more of such outer layers can also be applied in all embodiments of the first, second and/or third aspect of the invention. FIG. 15 in fact represents an embodiment in which the first as well as the second and third aspect are combined.

In FIG. 15, as a particular characteristic it is also illustrated that the slit 12 is performed up to a large depth.

Figure 16:
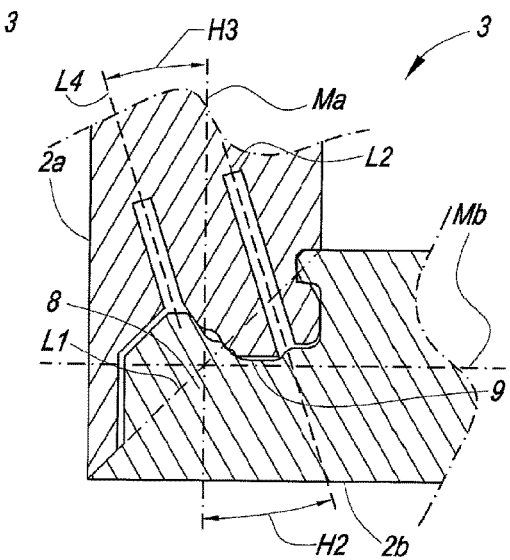

In FIG. 16, a locking tongue and groove connection 3 is shown, according to the first, second and third aspect of the present invention, wherein the tongue 8 consists of a split tongue and wherein the tongue is cut free at one side. Further, the represented example shows the characteristic that the orientation of the tongue slit and of the incision differs from the orientation of examples shown before. This illustrates the degrees of freedom which are obtained for freely chosing the orientation of the slit and the orientation of the incision and adapting them to the desired application.

Figure 17:
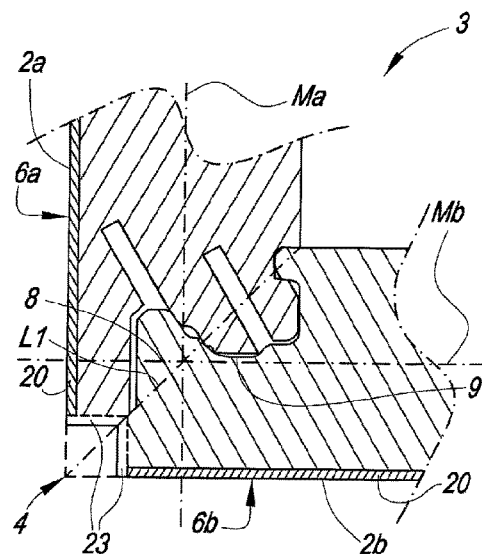

In FIG. 17, a locking tongue and groove connection 3 is shown, according to the first, second and third aspect of the present invention, wherein the miter coupling shows an open outer corner 4. In this embodiment, still according to the present invention, the panel surfaces 6a and 6b of the panel-shaped elements 2a and 2b do not continue up to the respective panel surface of the panel-shaped element to which it is coupled. In this case, a theoretical outer corner 4 is determined by the intersection of the respective prolongations of the respective panel surfaces 6a and 6b, and the theoretical miter line L1 is defined by the inner corner 5 and theoretical outer corner 4. The open outer corner 4 can possibly be finished by means of a masking strip 23, such as, for example, a laminate strip or a masking strip 23 of synthetic material, for example, an ABS strip.

Figure 18:
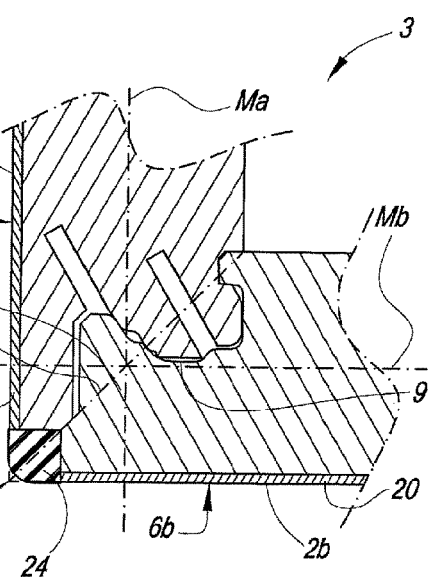

In FIG. 18, a locking tongue and groove connection 3 is shown, according to the first, second and third aspect of the present invention, wherein the miter coupling shows an open outer corner and wherein it comprises a separate corner element 24. It is noted that the example shown shows a covering 20 at one side of the panel-shaped elements. Of course, the covering may also be present on both sides of the panel-shaped elements.

Figure 19:
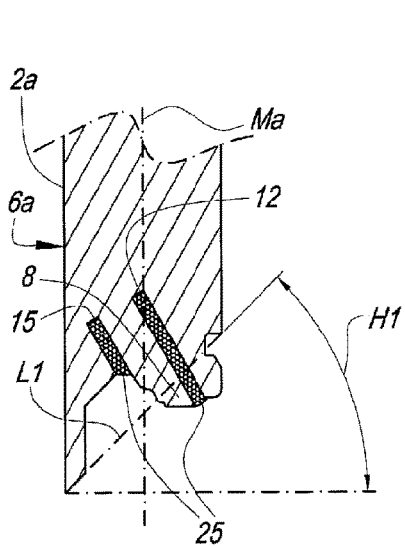

In FIG. 19, a panel-shaped element 2a with tongue of a locking tongue and groove connection 3 is shown, according to the first, second and third aspect of the present invention, wherein the tongue slit 12 and the incision 15 are filled with an elastically deformable material 25.

Figure 20:
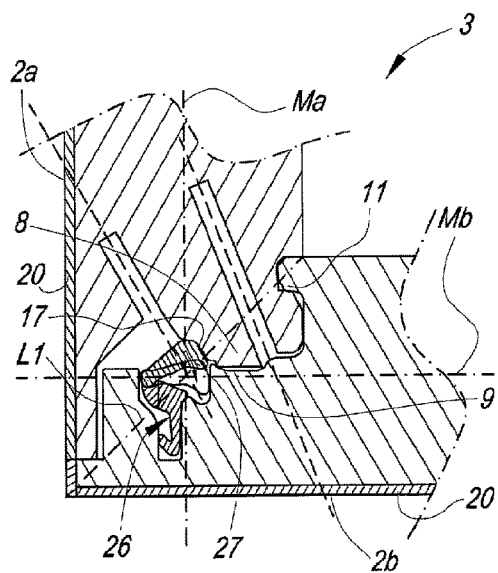

In FIG. 20, a locking tongue and groove connection 3 is shown, according to the first, second and third aspect of the present invention, wherein the orientation of the tongue slit and the orientation of the incision are different. In other words, in this embodiment the tongue slit angle H2 and the incision angle H3 are different. Further, in this figure an example is given of a possible embodiment in which use is made of a contact surface 17 formed by an insert 26 provided in the edge. More specifically, the shown insert 26 consists of a strip which is provided with a movable portion 27 with contact surface 17, which cooperates with the tongue 8 on the other panel-shaped element 2a. According to a not represented example, the locking element 11, too, can be formed by an insert, whether or not in combination with the insert 26.

Figure 21:
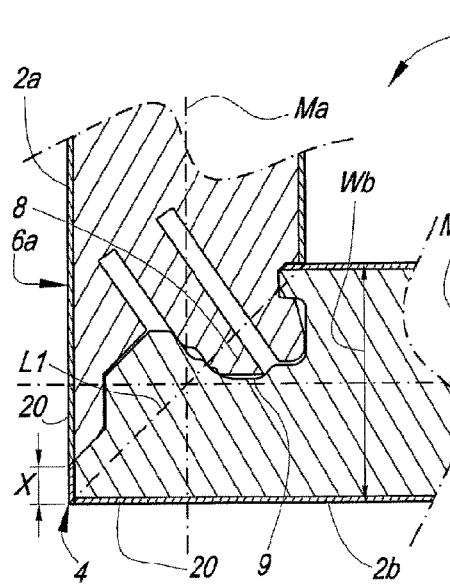

FIG. 21 shows a possible embodiment, wherein the panel surface 6a of the panel-shaped element having the tongue, which is situated at the side of the formed outer corner, does not continue up to the formed outer corner 4, but up to a certain distance X therefrom. However, this distance X is smaller than half of the panel thickness Wb of the panel-shaped element with groove 2b to which it is coupled.

Figure 22:
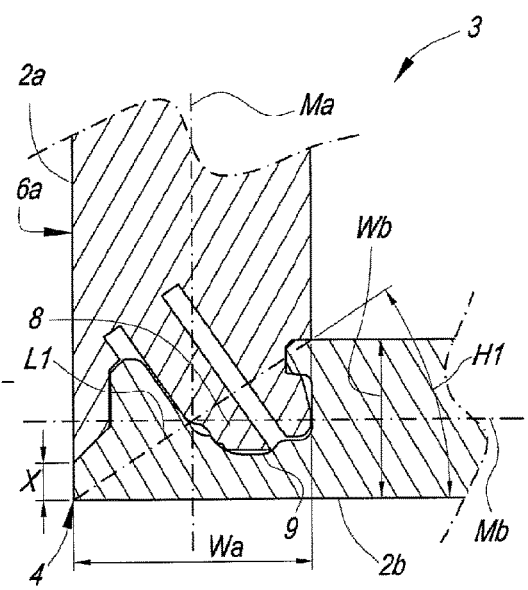

FIG. 22 shows a possible embodiment, wherein the panel-shaped elements, which are coupled to each other at an angle, have a different panel thickness. In this case, this is also called a non-perpendicular miter joint. The lower panel-shaped element 2b has a panel thickness Wb which is smaller than the panel thickness Wa of the left-hand panel-shaped element 2a to which it is coupled. It is noted that the miter angle H1 can be expressed as H1=arc tan(Wb/Wa).

Figures 23, 24:
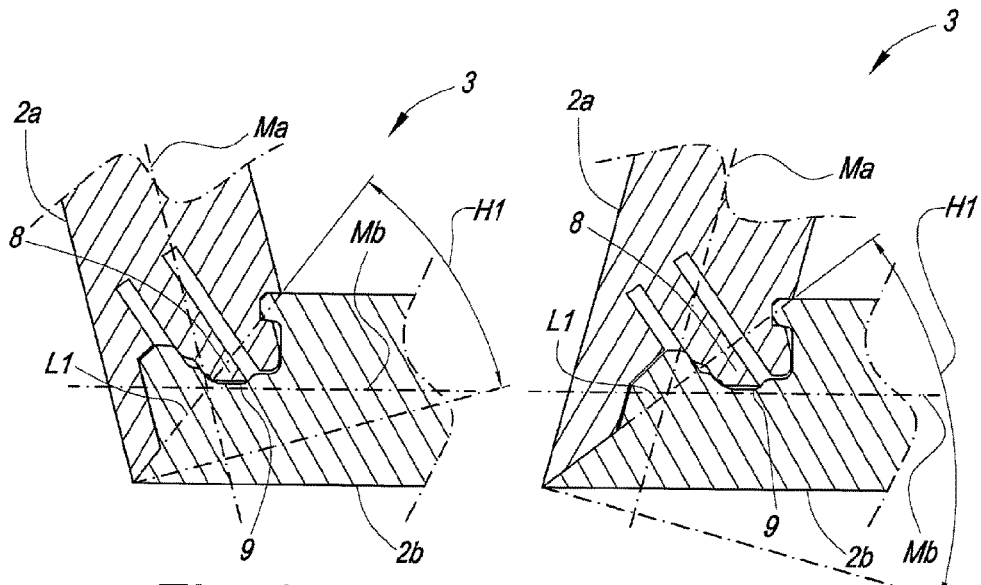

FIGS. 23 and 24 show possible embodiments, wherein the panel-shaped elements 2a and 2b are coupled to each other at an angle which is different from 90°. It is noted that in this case the miter angle H1 is different from 45°, as it is the case in the embodiments shown earlier. In FIG. 23, an example is shown wherein the formed angle measured at the inner corner is larger than 90°. In FIG. 24, an example is shown wherein the formed angle measured at the inner corner is smaller than 90°.

Figure 25:
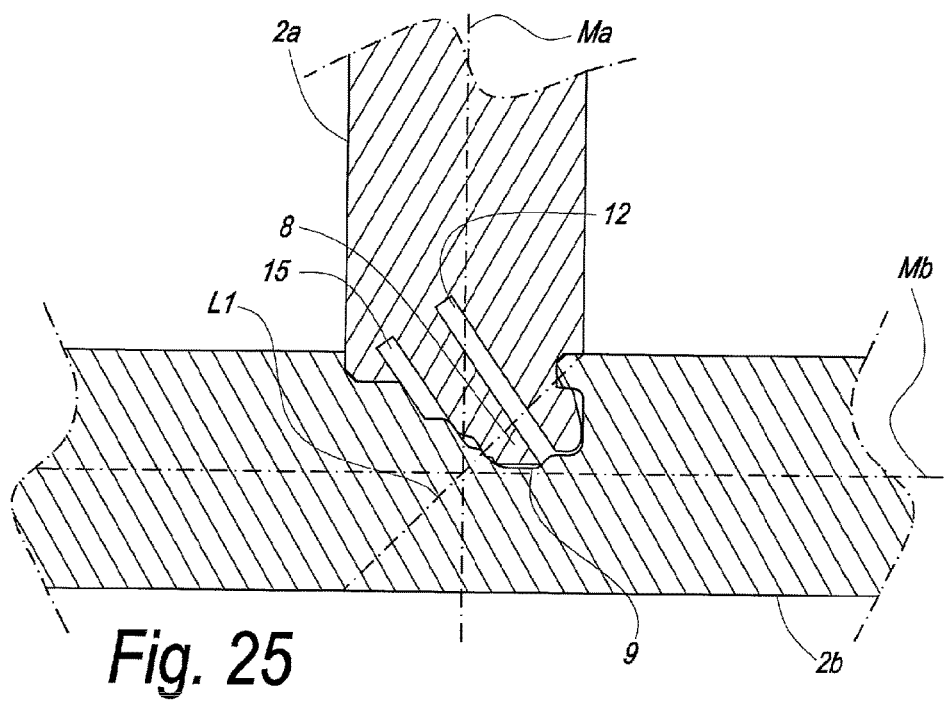
FIG. 25 represents a particular coupling.

From the represented corner connections of the invention, shapes can also be derived which are suitable for forming a T-connection. An example thereof is represented in FIG. 25.

Figure 26:
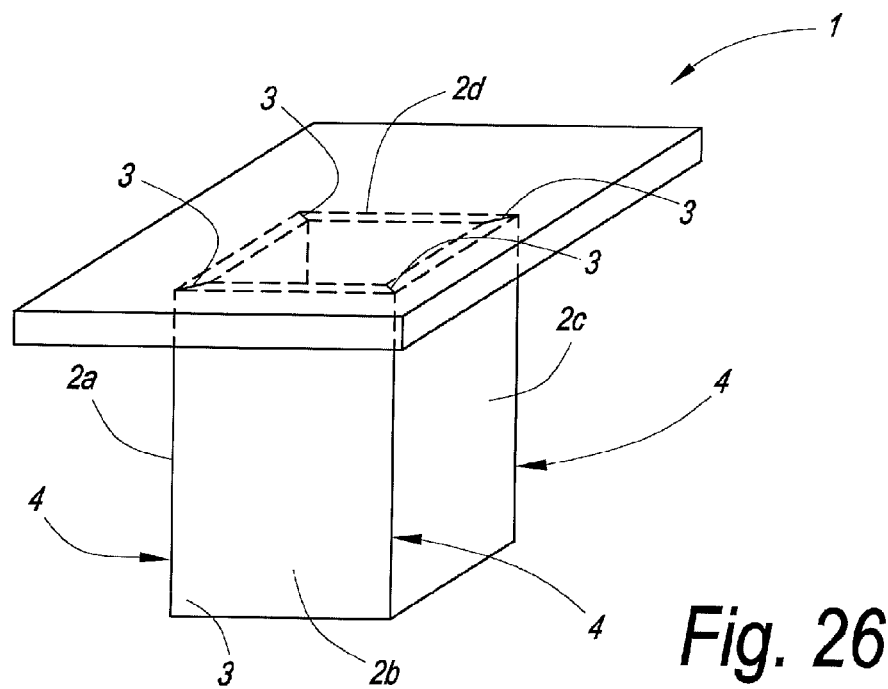
FIG. 26 represents a practical application of the invention.

FIG. 26 also shows a practical application of the invention, more particularly a table 1, wherein a base is composed of four panel-shaped elements 2a, 2b, 2c and 2d, which are connected to each other at an angle by means of mitered corner connection 3 according to the invention.

Figure 27:
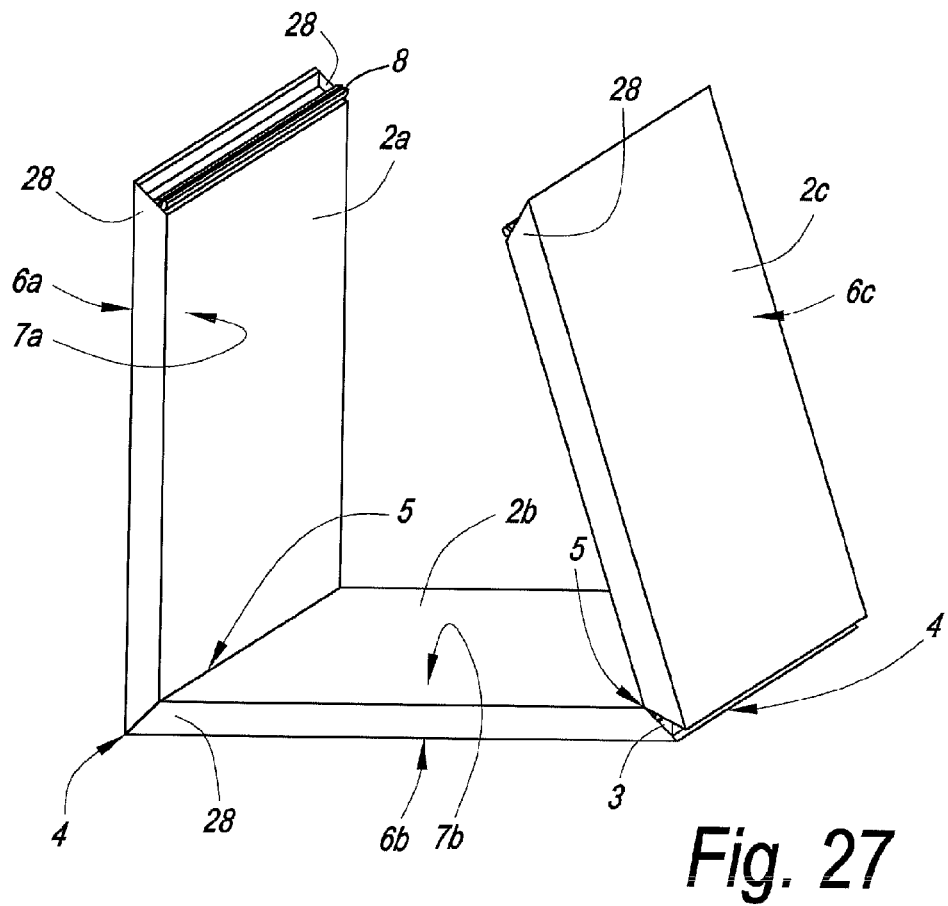
FIG. 27 represents three panel-shaped elements of a composed element being assembled, similar to that of FIG. 1, however, provided with a masking strip.

FIG. 27 shows three panel-shaped elements 2a, 2b and 2c, in construction as from a similar composed element such as of FIG. 1, however, wherein the panel-shaped elements 2a, 2b and 2c, on edges where no tongue 8 or groove are present, are finished with a masking strip 28, which is miter-joined with the masking strip 28 of the respective other panel-shaped elements.

Figure 28:
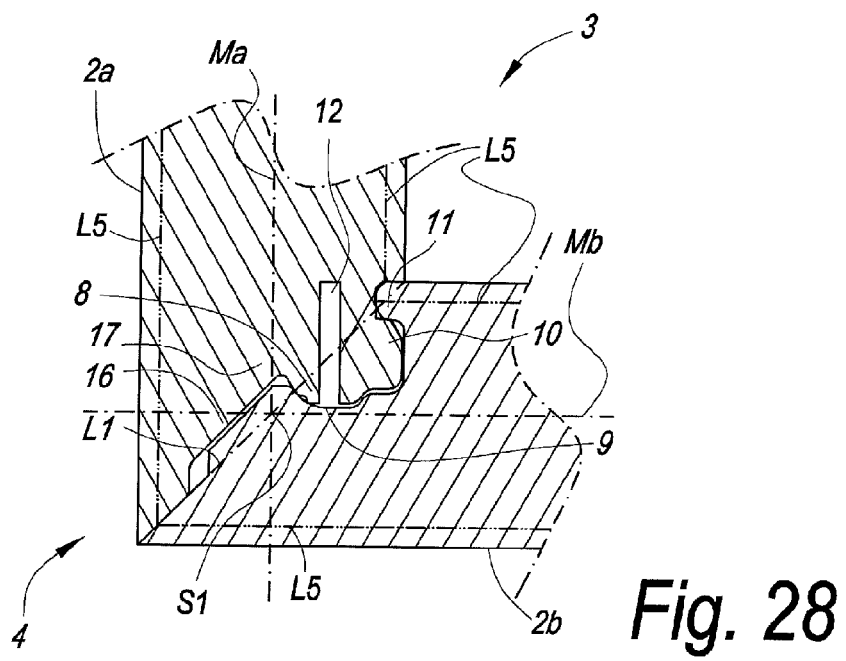
FIGS. 28 to 31 represent a number of embodiments for a corner connection in a composed element.

FIG. 28 shows an embodiment which is realized, amongst others, according to the fourth aspect of the invention. Herein, this thus relates to a composed element, which comprises at least two panel-shaped elements 2a-2b, each with respective panel surfaces, wherein for each panel-shaped element a center line Ma-Mb is defined centrally between the two panel surfaces of that panel-shaped element;

wherein said panel-shaped elements preferably are manufactured of wood-based material;

wherein said panel-shaped elements can be coupled to each other at an angle of 90 degrees or approximately 90 degrees by means of a locking tongue and groove connection and herein respectively form an inner and outer corner, wherein the inner and outer corner define a theoretical miter line L1;

wherein said locking tongue and groove connection substantially is formed of a tongue 8 on one of said panel-shaped elements, of a groove 9 on another of said panel-shaped elements and of locking elements 10-11 provided on said tongue and groove, respectively;

wherein, seen in cross-section, the panel surface of each panel-shaped element at the side of the formed outer corner extends at least up to the center line of the panel-shaped element to which it is coupled; and wherein the tongue preferably consists of a split tongue, with thus at least a first tongue portion and a second tongue portion, as well as a slit 12 situated there between;

further with the characteristic that said tongue 8, at the location of the theoretical miter line L1, is located entirely outward of the midpoint S1 of the theoretical miter line L1, such between the midpoint S1 and the inner corner.

Figure 29:
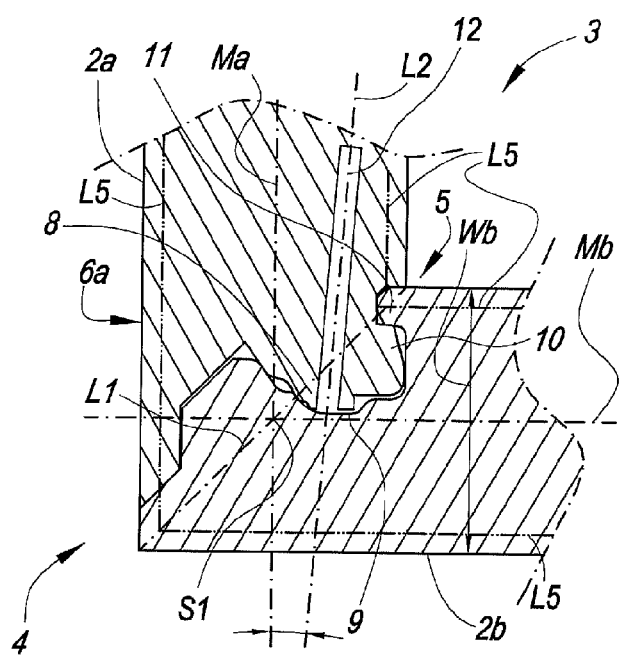

FIG. 29 shows another particular variant of the first aspect of the invention. Herein, this relates to a composed element, wherein the tongue 8 consists of a split tongue, wherein the slit 12, globally seen and/or with the wall thereof which is situated closest to the inner corner, from the free end, in other words, open end thereof extends towards the bottom inclined towards the panel surface which is located at the inner corner 5, such as is clearly visible here by means of the inclined axis line L2. Hereby, the flexibility of the tongue portion which comprises the locking element 10 can be adjusted in an easy manner by letting the slit end closer or less close to the respective panel surface.

Figure 30:
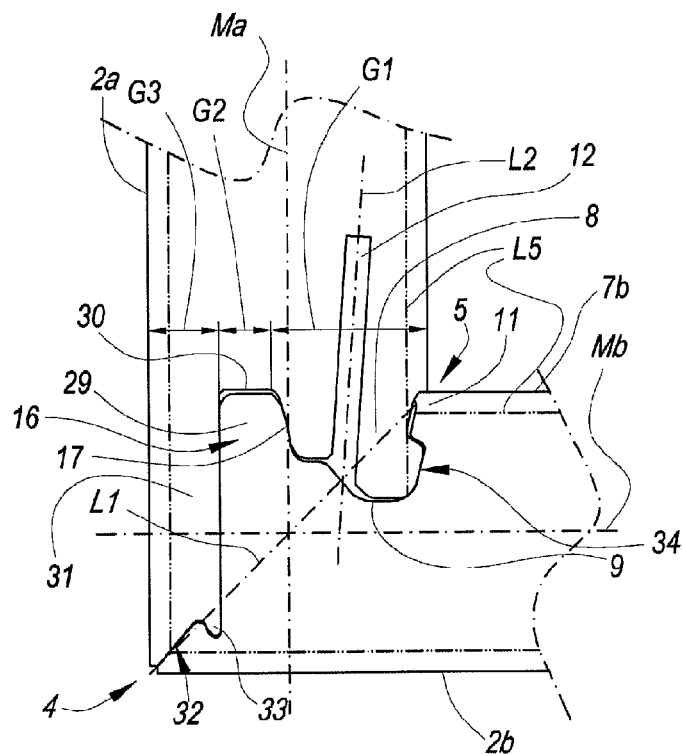

FIG. 30 represents a particular embodiment of the second aspect of the invention. Herein, the groove 9, at least at one side thereof, seen in cross-section, is bordered by a lip 16 which is located at least with a portion 29 thereof beyond said theoretical miter line L1, and this lip 16, in coupled condition, is located at the side of the tongue 8 which is situated closest to the formed outer corner 4, and this in such a manner that the aforementioned portion 29 provides at least a contact surface 17 for the tongue 8. Hereby, a good lateral support is offered for the tongue.

A further particularity herein consists in that the lip 16 has a distal end 30, which extends up to the plane of the panel-shaped element 2b in which the groove 8 is provided and which is situated at the inner corner and preferably is formed by a portion of the inner wall of the panel-shaped element. In other words, this means that the end 30 is formed by a portion of the panel surface 7b. Hereby, it is obtained that the groove 9 can be provided in the flat panel surface 7b in a simple manner.

Another particularity, which may or may not be applied in combination with the particularity described immediately herein above, consists in that the panel-shaped element which is provided with the tongue has a protruding edge portion 31, which on the outer side provides for a prolongation of the panel surface and on the inner side is situated opposite to said portion 29 of the lip 16 and preferably adjoining thereto, wherein this protruding edge portion 31 extends at least up to the center line Mb of the panel-shaped element which comprises the groove 9, and preferably up to the corner point or approximately up to the corner point of the actual outer corner. Hereby, a miter coupling is obtained with a connection near the corner point, whereas the tongue 8 as such, globally seen, can be realized approximately perpendicular to the panel-shaped element having the groove.

According to a particular characteristic, the protruding edge portion 31, next to its distal end 32, comprises a locking part 33, which, in coupled condition, engages behind the other panel-shaped element 2b, in such a manner that the relatively thin edge portion 31 is prevented from bending out due to warping.

Figure 31:
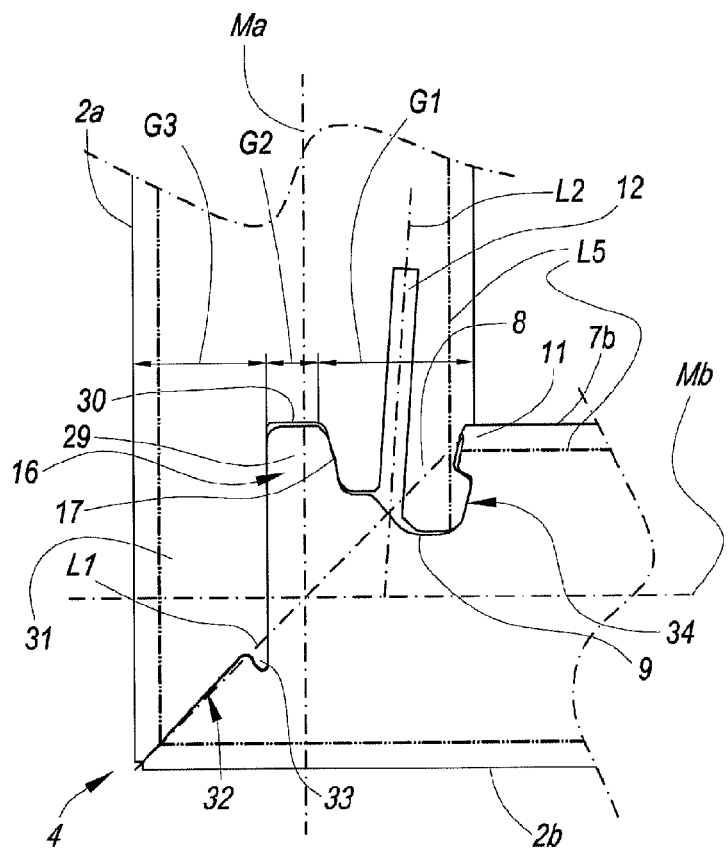

FIGS. 30 and 31 commonly illustrate the fifth aspect of the invention. Both figures are represented at the same scale. The panel thickness of the panel-shaped elements of FIG. 30 is smaller than the panel thickness of the panel-shaped elements of FIG. 31. The tongue and groove profiles which are situated in the zone G1, however, are identical to each other in respect to shape as well as to size. Adaptation takes place outside of the zones G1, thus in zone G2 or G3. In the example, this is in zone G3, by adapting the thickness of the edge portion 31 in function of the panel thickness.

However, this latter does not exclude to apply identical profiles also outside of the zone G1. In the represented example, the zones G2 and G3 are made identical to each other as well, with the only difference that the portion being at 45 degrees, which is situated on the outer corner 4, extends somewhat longer. It is clear that then the same cutting tools and tool settings can be applied for the entire edge finishing.

In FIGS. 30 and 31 also a particularity is represented, which consists in that the panel-shaped element 2a can be fixedly snapped into the panel-shaped element 2b by means of a movement perpendicular or approximately perpendicular to this latter, such by means of an inclination 34, which can shift along the locking element 11.

According to a general preferred characteristic, the tongue and groove connection is made such that the panel-shaped elements can be connected to each other by means of a snap movement as well as by means of a turning movement.

It is noted that the herein above-described panel-shaped elements according to the invention can be composed in different manners. According to a first possibility, for such panel-shaped element a wood-based single board is applied, which is manufactured of one and the same or substantially the same material, for example, a single MDF board (Medium Density Fiberboard) or HDF board (High Density Fiberboard), or a classic particle board, possibly with finer wood particles on the exterior surfaces. By a single board is meant that only one substantial structural material layer is applied, which does not exclude that other thin layers, such as coverings, can be present. Alternatively, the panel-shaped elements will consist of a multi-layered board, such as, for example, plywood boards.

Further, it is also noted that the invention is in no way limited to cubical composed elements, but that also complete pieces of furniture, possibly with a plurality of compartments or partitions, possibly provided with shelves, drawers, doors and the like, can be provided with a respective corner connection according to the invention.

By a "composed element", according to the invention an element has to be understood which is already assembled, as well as such element which still is in disassembled condition. More particularly, this means that a piece of RTA furniture, which meets the invention and still is in disassembled condition, for example, packaged as a flat-pack piece of furniture, in this condition also has to be considered a "composed element".

It is clear that the invention primarily relates to furniture and furniture parts. It also relates to panel-shaped elements which comprise one or more coupling parts with which a corner connection according to the invention can be realized.

Finally, it is also noted that said panel-shaped elements mostly are elements which cover an entire or large portion of a wall of the composed elements of which it is a part. However, in some applications, such as, for example, basic elements of a piece of kitchen furniture, more particularly, for example, the basic elements of floor units, the panel-shaped element can be provided at the height of one or more walls of the composed element as a smaller component, such as a slat. In the example of the piece of kitchen furniture, the slat typically serves as a support surface for an additional panel-shaped element, such as, for example, a worktop.

The present invention is in no way limited to the embodiments described herein above; on the contrary, such composed elements and the respective corner connection can be realized according to various forms and dimensions, without leaving the scope of the present invention.

The invention claimed is:

1. A composed element, which comprises at least two panel-shaped elements, each with respective panel surfaces, wherein for each panel-shaped element a center line is defined centrally between the two panel surfaces of that panel-shaped element;

wherein said panel-shaped elements are manufactured of wood-based material;

wherein said panel-shaped elements can be coupled to each other at an angle by means of a locking tongue and groove connection and thereby respectively form an inner corner and an outer corner, wherein the inner corner and the outer corner define a theoretical miter line;

wherein said locking tongue and groove connection respectively is substantially formed of a tongue on one of said panel-shaped elements, of a groove on another of said panel-shaped elements, and of locking elements provided on said tongue and groove;

wherein, seen in cross-section, the panel surface of each panel-shaped element at the side of the outer corner extends at least up to the center line of the panel-shaped element to which it is coupled;

wherein the tongue consists of a split tongue, with thus at least a first tongue portion and a second tongue portion, as well as a slit situated there between;

wherein said slit, seen in cross-section, globally extends according to a direction which deviates from the direction of the center line of the panel-shaped element on which the tongue is provided;

wherein said slit in its inward direction points to the panel surface of the panel-shaped element comprising the tongue that is located at the outer side of the outer corner; and wherein said locking element that is provided at said tongue is located on the side of the tongue that is located on the inner corner.

2. The composed element of claim 1, wherein said theoretical miter line comprises a midpoint defined as a point equidistant from the inner corner and the outer corner, and wherein said tongue is arranged eccentric in respect to the midpoint.

3. The composed element of claim 1, wherein said tongue on at least one side, by means of an incision is cut free in respect to adjacent panel material.

4. The composed element of claim 1, wherein said locking elements are only present at one side of the tongue.

5. The composed element of claim 1, wherein said groove, on at least one side thereof, seen in cross-section, is bordered by a lip which extends to beyond said theoretical miter line.

6. The composed element of claim 1, wherein the composed element is a piece of furniture or a furniture part.

7. A composed element, which comprises at least two panel-shaped elements, each with respective panel surfaces, wherein for each panel-shaped element a center line is defined centrally between the two panel surfaces of that panel-shaped element;

wherein said panel-shaped elements are manufactured of wood-based material;

wherein said panel-shaped elements can be coupled to each other at an angle by means of a locking tongue and groove connection and thereby form an inner corner and an outer corner, wherein the inner corner and the outer corner define a theoretical miter line;

wherein said locking tongue and groove connection respectively is substantially formed of a tongue on one of said panel-shaped elements, of a groove on another of said panel-shaped elements, and of locking elements provided on said tongue and groove;

wherein the panel-shaped elements are configured such that they can be coupled to each other laterally and at an angle by means of a turning movement and/or a snap movement;

wherein, seen in cross-section, the panel surface of each panel-shaped element at the side of the outer corner extends at least up to the center line of the panel-shaped element to which it is coupled;

wherein said groove, on at least one side thereof, seen in cross-section, is bordered by a lip, which extends to beyond said theoretical miter line;

wherein said lip in a coupled condition of the panel-shaped elements extends along a side of the tongue which is situated closest to the outer corner and forms at least one contact surface with the tongue, which, in the coupled condition, provides for a support for the tongue at least in the direction perpendicular to the center line of said panel-shaped element having said tongue; and wherein said locking element that is provided at the tongue is located on the side of the tongue closest to the inner corner.

8. The composed element of claim 7, wherein the tongue consists of a split tongue, with thus at least a first tongue portion and a second tongue portion, as well as a slit situated there between.

9. The composed element of claim 7, wherein said theoretical miter line comprises a midpoint defined as a point equidistant from the inner corner and the outer corner, wherein said tongue is arranged eccentric in respect to the midpoint.

10. The composed element of claim 7, wherein said tongue on at least one side by means of an incision is cut free with respect to adjacent panel material.

11. The composed element of claim 7, wherein said locking elements are only present at one side of the tongue.

12. The composed element of claim 7, wherein said lip in coupled condition forms at least two separate contact surfaces with the tongue, which provide for support of the tongue at least in the direction perpendicular to the direction of the center line of said panel-shaped element having said tongue.

13. The composed element of claim 7, wherein at least one of said contact surfaces is situated beyond the theoretical miter line at the side of the panel-shaped element having the tongue.

14. The composed element of claim 7, wherein the tongue and the groove have such a profile that they can be brought into a mutually coupled condition by means of a turning movement as well as by means of a translation movement towards each other.

15. The composed element of claim 7, wherein at least the tongue and preferably also the groove are formed by profiles which are made in one piece with the respective panel-shaped element by means of a cutting treatment.

16. The composed element of claim 7, wherein the panel surface of the panel-shaped element having a groove at the side of the formed inner corner, continues at the height of this inner corner to beyond the theoretical miter line, as a result of which at that location a contact surface is formed, which coincides with a portion of said panel surface.

17. The composed element of claim 7, wherein said panel-shaped elements, in respect to the material from which they are manufactured, show one or more of following characteristics:

the panel-shaped elements substantially consist of a basic board formed of solid wood;

the panel-shaped elements substantially consist of a basic board formed of a wood-based pressed board;

the panel-shaped elements substantially consist of a basic board formed of wood fibers including MDF or HDF;

the panel-shaped elements substantially consist of a basic board formed of particle board;

the panel-shaped elements are formed of multi-layered and/or multi-part board;

the panel-shaped elements are formed of melaminated board;

the panel-shaped elements are constructed as a hollow board or as a board provided with cavities;

the panel-shaped elements are constructed of a basic board with a covering of synthetic material or textile.

18. The composed element of claim 7, wherein said groove, on at least one side thereof, seen in cross-section, is bordered by a lip, which, at least with a portion thereof, is situated beyond said theoretical miter line, and wherein said lip in coupled condition is located at the side of the tongue which is situated closest to the outer corner, and wherein said portion provides at least a contact surface for the tongue.

19. The composed element of claim 7, wherein the tongue consists of a split tongue, with a slit, which, seen in cross-section, globally extends according to a direction which deviates from the direction of the center line of the panel-shaped element on which the tongue is provided, and wherein the slit, globally seen and/or with the wall thereof situated closest to the inner corner, extends from the free end thereof towards the bottom inclined towards the panel surface which is located at the inner corner.

20. The composed element of claim 7, wherein the composed element is a piece of furniture or a furniture part.

21. A composed element, which comprises at least two panel-shaped elements, each with respective panel surfaces, wherein for each panel-shaped element a center line is defined centrally between the two panel surfaces of that panel-shaped element;

wherein said panel-shaped elements are manufactured of wood-based material;

wherein said panel-shaped elements can be coupled to each other at an angle by means of a locking tongue and groove connection and thereby respectively form an inner corner and an outer corner, wherein the inner corner and the outer corner define a theoretical miter line;

wherein said locking tongue and groove connection respectively is substantially formed of a tongue on one of said panel-shaped elements, of a groove on another of said panel-shaped elements, and of locking elements provided on said tongue and groove;

wherein, seen in cross-section, the panel surface of each panel-shaped element at the side of the outer corner extends at least up to the center line of the panel-shaped element to which it is coupled; and wherein said tongue is cut free on at least one side, by means of an incision, the incision being realized in the panel material of the panel-shaped element comprising the tongue, wherein a tongue side is free in respect to adjacent panel material of the panel-shaped element defining the tongue.

22. The composed element of claim 21, wherein the theoretical miter line comprises a midpoint defined as a point that is equidistant from the inner corner and the outer corner, and wherein said tongue is eccentric in respect to the midpoint.

23. A composed element, which comprises at least two panel-shaped elements, each with respective panel surfaces, wherein for each panel-shaped element a center line is defined centrally between the two panel surfaces of that panel-shaped element;

wherein said panel-shaped elements are manufactured of wood-based material;

wherein said panel-shaped elements can be coupled to each other at an angle of 90 degrees or approximately 90 degrees by means of a locking tongue and groove connection and herein respectively form an inner and an outer corner, wherein the inner and the outer corner define a theoretical miter line comprising a midpoint being defined as a point that is equidistant from the inner corner and the outer corner;

wherein said locking tongue and groove connection substantially is formed of a tongue on one of said panel-shaped elements, of a groove on another of said panel-shaped elements, and of locking elements provided on said tongue and groove, respectively;

wherein the panel-shaped elements are configured such that they can be coupled to each other laterally and at an angle by means of a turning movement and/or a snap movement;

wherein, seen in cross-section, the panel surface of each panel-shaped element at the side of the outer corner extends at least up to the center line of the panel-shaped element to which it is coupled, and;

wherein said tongue, at the location of the theoretical miter line, by a full width thereof is located entirely aside of the midpoint of the theoretical miter line, such as between the midpoint and the inner corner.

24. The composed element of claim 23, wherein the tongue consists of a split tongue.

* * * * *